(12) United States Patent
Dogin et al.

(10) Patent No.: US 10,504,163 B2
(45) Date of Patent: Dec. 10, 2019

(54) SYSTEM FOR PAYMENT, DATA MANAGEMENT, AND INTERCHANGES FOR USE WITH GLOBAL SHOPPING CART

(71) Applicant: MASTERCARD INTERNATIONAL INCORPORATED, Purchase, NY (US)

(72) Inventors: Jennifer Dogin, Mamaroneck, NY (US); Brian Maw, Norwalk, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/792,099

(22) Filed: Jul. 6, 2015

(65) Prior Publication Data

US 2016/0171570 A1 Jun. 16, 2016

Related U.S. Application Data

(63) Continuation-in-part of application No. 13/829,144, filed on Mar. 14, 2013, now abandoned, which is a
(Continued)

(51) Int. Cl.
*G06Q 30/00* (2012.01)
*G06Q 30/06* (2012.01)
*G06Q 50/00* (2012.01)

(52) U.S. Cl.
CPC ..... *G06Q 30/0605* (2013.01); *G06Q 30/0633* (2013.01); *G06Q 30/0635* (2013.01); *G06Q 30/0641* (2013.01); *G06Q 50/01* (2013.01)

(58) Field of Classification Search
CPC .......... G06Q 30/0605; G06Q 30/0633; G06Q 30/0635
(Continued)

(56) References Cited

U.S. PATENT DOCUMENTS 5,883,968 A * 3/1999 Welch ..................... A47F 9/045
382/100
6,101,482 A 8/2000 DiAngelo et al.
(Continued)

OTHER PUBLICATIONS

Consumer Selection of E-Commerce Websites in a B2C Environment: A Discrete Decision Choice Model (Year: 2009).*
(Continued)

*Primary Examiner* — Jeffrey A. Smith
*Assistant Examiner* — Lalith M Duraisamygurusamy
(74) *Attorney, Agent, or Firm* — Ohlandt, Greeley, Ruggiero & Perle, L.L.P.

(57) ABSTRACT

A payment interchange for use in a global shopping cart and a method for its use are provided. Also, provide is management of data relationships between a global online shopping cart and various manager components that encompass data management access. The global shopping cart includes a storage medium having thereon computer instructions for implementing one or more functions of the global shopping cart, and a processor for executing the computer instructions to provide functions including a payment function for paying for an item to be purchased. The global shopping cart has a flexible application programming interface (API) framework sufficient to support the payment interchange including the payment function for paying for an item to be purchased by one or more users of the global shopping cart and by one or more payment modes or sources.

20 Claims, 15 Drawing Sheets

Related U.S. Application Data continuation-in-part of application No. 13/829,533, filed on Mar. 14, 2013, now abandoned, application No. 14/792,099, which is a continuation-in-part of application No. 13/828,773, filed on Mar. 14, 2013, now abandoned, said application No. 14/792,099 is a continuation-in-part of application No. 13/829,296, filed on Mar. 14, 2013, now abandoned, application No. 14/792,099, which is a continuation-in-part of application No. 13/829,421, filed on Mar. 14, 2013, now abandoned, application No. 14/792,099, which is a continuation-in-part of application No. 13/828,978, filed on Mar. 14, 2013, now abandoned.

(60) Provisional application No. 61/763,755, filed on Feb. 12, 2013, provisional application No. 61/750,905, filed on Jan. 10, 2013, provisional application No. 61/737,556, filed on Dec. 14, 2012.

(58) Field of Classification Search
USPC .......................................................... 705/26.8
See application file for complete search history.

(56) References Cited

U.S. PATENT DOCUMENTS

| | | | |
|---|---|---|---|
| 6,550,013 B1 | 4/2003 | Gervais et al. | |
| 7,212,984 B2* | 5/2007 | Wolfe | G06Q 10/06 705/7.22 |
| 8,401,904 B1 | 3/2013 | Simakov et al. | |
| 8,622,308 B1 | 1/2014 | Field et al. | |
| 8,635,119 B1 | 1/2014 | Hariharan et al. | |
| 8,805,996 B1 | 8/2014 | Gauvin | |
| 2002/0010637 A1* | 1/2002 | Lieu | G06Q 30/02 705/26.1 |
| 2002/0042764 A1* | 4/2002 | Gardner | G06Q 40/00 705/35 |
| 2002/0156685 A1 | 10/2002 | Ehrlich et al. | |
| 2003/0132298 A1* | 7/2003 | Swartz | G06K 17/00 235/472.02 |
| 2004/0148181 A1* | 7/2004 | McKnight | G06Q 30/012 705/302 |
| 2004/0205006 A1 | 10/2004 | Kanai | |
| 2005/0251410 A1* | 11/2005 | Kahn | G06Q 30/02 705/26.1 |
| 2006/0122895 A1 | 6/2006 | Abraham et al. | |
| 2006/0293969 A1 | 12/2006 | Barger et al. | |
| 2008/0046331 A1 | 2/2008 | Rand | |
| 2008/0126164 A1* | 5/2008 | Jaeck | G06Q 10/087 705/28 |
| 2008/0172629 A1 | 7/2008 | Tien et al. | |
| 2008/0235005 A1 | 9/2008 | Golan et al. | |
| 2008/0249863 A1* | 10/2008 | Redmond | G06Q 10/10 705/14.27 |
| 2009/0207983 A1 | 8/2009 | Nour-Omid | |
| 2009/0281927 A1 | 11/2009 | Aliabadi et al. | |
| 2009/0287471 A1 | 11/2009 | Bennett | |
| 2010/0030578 A1* | 2/2010 | Siddique | G06Q 10/0637 705/3 |
| 2010/0114876 A1 | 5/2010 | Mandel et al. | |
| 2011/0010448 A1 | 1/2011 | Gill et al. | |
| 2011/0093361 A1* | 4/2011 | Morales | G06Q 10/087 705/26.62 |
| 2011/0119317 A1 | 5/2011 | Kazoun et al. | |
| 2011/0184834 A1 | 7/2011 | Perrochon et al. | |
| 2011/0246945 A1 | 10/2011 | Caine et al. | |
| 2012/0030065 A1 | 2/2012 | Tarvydas et al. | |
| 2012/0047011 A1* | 2/2012 | Rippetoe | G06Q 30/02 705/14.45 |
| 2012/0066306 A1 | 3/2012 | Leacock et al. | |
| 2012/0150683 A1 | 6/2012 | Herrington | |
| 2012/0150863 A1 | 6/2012 | Fish et al. | |
| 2012/0197927 A1 | 8/2012 | Qian et al. | |
| 2012/0209749 A1* | 8/2012 | Hammad | G06Q 30/06 705/27.1 |
| 2012/0221420 A1* | 8/2012 | Ross | G06Q 40/00 705/16 |
| 2012/0253972 A1 | 10/2012 | Oskolkov et al. | |
| 2012/0271790 A1 | 10/2012 | Lappas et al. | |
| 2012/0303425 A1 | 11/2012 | Katzin et al. | |
| 2013/0065678 A1 | 3/2013 | Nelson et al. | |
| 2013/0145284 A1 | 6/2013 | Anantharaman et al. | |
| 2013/0226688 A1* | 8/2013 | Harvilicz | G06Q 30/02 705/14.39 |
| 2013/0246258 A1 | 9/2013 | Dessert | |
| 2013/0317939 A1 | 11/2013 | Urbanski et al. | |
| 2013/0339115 A1 | 12/2013 | Soldate | |

OTHER PUBLICATIONS

International Search Report dated Mar. 18, 2014 for PCT/US2013/075086.

Written Opinion dated Mar. 18, 2014 for PCT/US2013/075086.

* cited by examiner

SYSTEM FOR PAYMENT, DATA MANAGEMENT, AND INTERCHANGES FOR USE WITH GLOBAL SHOPPING CART

CROSS REFERENCE TO RELATED APPLICATIONS

This application is a continuation-in-part of U.S. patent application Ser. No. 13/829,144, U.S. patent application Ser. No. 13/829,533, U.S. patent application Ser. No. 13/828,733, U.S. patent application Ser. No. 13/829,296, U.S. patent application Ser. No. 13/829,421, and U.S. patent application Ser. No. 13/828,978, all of which were filed on Mar. 14, 2013, and this application claims the benefit of U.S. Provisional Application No. 61/737,556 filed on Dec. 14, 2012, U.S. Provisional Application No. 61/750,905 filed on Jan. 10, 2013, and U.S. Provisional Application Ser. No. 61/763,755 filed on Feb. 12, 2013, the entire contents of which are incorporated herein by reference.

BACKGROUND OF THE DISCLOSURE

1. Field of the Disclosure

The present disclosure relates to electronic shopping. More particularly, the present disclosure relates to (1) a payment interchange for allowing a user to make payment for orders placed by or of a multipurpose, global online shopping cart, and (2) management of data relationships between a global online shopping cart and various manager components that encompass data management access. Further, the present disclosure relates to a merchant interchange for allowing a merchant to participate in tasks and projects, and to fulfill orders placed by or of a multipurpose, global online shopping cart, and a shopping cart interchange for allowing any individual to utilize a multipurpose online shopping cart throughout the world.

2. Description of the Related Art

The multitude of shopping choices available on-line and at points of sale have made maintaining the track of purchases a relatively complex task. It is sometimes very difficult to track and organize all data concerning purchases made by an individual or a family over a period of time. Further, there are some tasks or projects undertaken that may extend for a year or more. For example, planning a wedding or a construction project, such as adding one or more rooms to a house, may take over a year. There are other tasks, such as office supply inventory control, where the task is repetitive in nature, as opposed to a task with a definitive end.

During the course of these projects, it is desirable to have an organized way to construct a list of items that must be purchased or services that must be obtained, and to keep track of what has been purchased, and what needs to be purchased. Often, after a project has been completed, it is desirable to have information on the project so that, if necessary, replacement items can be purchased, warrantees can be exercised, and additional services of the type utilized can be obtained. Generally, during the course of several years, the information required to purchase replacement components, exercise warrantees, or find the required services may no longer be available due to the loss of paper records and receipts.

For some projects, such as a wedding, it is desirable that certain aspects be shared with anyone authorized by the owner. For example, a bridal registry should be available on-line. Furnishings for a new addition to a house can be made available for comment and/or ranking by anyone authorized by the owner, who may have excellent ideas for alternative furnishings.

When a global shopping cart is established, there is a need for a payment interchange that accepts payments from any number of sources for orders placed by or of a multipurpose, global online shopping cart, a need for a merchant interchange to allow a merchant to participate in projects under a global shopping cart, a need for a shopping cart interchange for allowing anyone authorized by the owner to utilize the global shopping cart, and a need for managing data relationships between the global shopping cart and various data management access components. There is also a need of the owner or user of the global shopping cart to selectively obtain data in the quickest amount of time and subsequently to manage that data.

SUMMARY OF THE DISCLOSURE

There is provided a global shopping cart payment system in a global shopping cart. The system has a processor and a memory that has instructions that are readable by the processor. When the instructions are read by the processor, the processor can cause the establishment of the global shopping cart for an owner in the memory. The global shopping cart has a payment module having owner payment information including an owner payment mode. The processor can also cause the creation, for the owner, of a task in the global shopping cart. The global shopping cart can discretely store data relating to an item that relates to the task. The processor can further cause a selected area in the global shopping cart to be provided that is accessible by the owner of the global shopping cart and an invitee of the global shopping cart.

The global shopping cart can receive profile information from the invitee to permit access for the invitee the selected area of the global shopping cart and invitee payment information for at least one invitee payment mode, create a profile for the invitee based on the profile information and the payment information, receive a request from the owner or the invitee to add the item to be purchased to the global shopping cart, access a payment module of the global shopping cart having owner payment information, and conduct a financial transaction in the global shopping cart for the item to be purchased. Advantageously, the financial transaction is conducted using both invitee payment information and owner payment information to enable the owner and invitee to share payment for the item.

The processor can cause the sending of an invitation to the invitee to join the global shopping cart that provides access to the selected area in the global shopping cart for a merchant.

The payment module of the global shopping cart can include an owner payment mode having the owner payment information and an invitee payment mode having the invitee payment information.

The memory further comprises a merchant data store having information relating to goods and services of the merchant. The data store includes rewards offered by the merchant generated by purchases greater than a predetermined value or promotional codes. The memory further comprises a financial data store including information relating to international finance, domestic finance, and personal finance, and the instructions further cause the processor to execute the step of updating the information in the financial data store using a crawling function.

In the system of the present disclosure, the merchant has access to the global shopping cart to manage inventory needs and understand future products that would be desirable to the owner of the global shopping cart and to indicate that the item is not in inventory and provide an indication of when the item will be available. The merchant can provide a suggestion to add a second item to the global shopping cart that is related to the task. The merchant can be a contractor.

The global shopping cart can have a public area to post items for swap or barter between the owner and a user of a second global shopping cart. The global shopping cart can also have a shipping module for managing a shipping preference, in which the shipping preference is at least one preference selected from the group consisting of: parcel post, regular mail, air shipments, courier, digital delivery, in-store pick up, pick up at another location, and a location found by doing an internet search with a smartphone.

The system can have a dashboard area in the global shopping cart enabling the owner to change payment mode preferences. The system can have an owner profile data store that includes profile information comprising age range, income range, gender, and residence to enable a merchant to tailor a merchant's product, service, and inventory to the owner of the global shopping cart.

The owner payment mode of the global shopping cart can be a digital wallet, near field communication (NFC), quick response (QR) code, and a third party payment system. The owner payment mode can alternatively be a non-traditional mode such as a barter, virtual currency, bitcoin, social media credit, automated clearing house (ACH), coupon, biometric payment, enhanced mobile payment through a camera or geo location device, payment through a form factor comprising a watch, ring, eye glasses, hand or body gestures in coordination with a mobile or other form factor, enhanced and virtual currency. The invitee payment mode can be a digital wallet, near field communication (NFC), quick response (QR) code, and a third party payment system. The invitee payment mode can alternatively be a non-traditional mode such as a barter, virtual currency, bitcoin, social media credit, automated clearing house (ACH), coupon, biometric payment, enhanced mobile payment through a camera or geo location device, payment through a form factor comprising a watch, ring, eye glasses, hand or body gestures in coordination with a mobile or other form factor, enhanced and virtual currency Further, the transaction can be conducted using at least two different owner payment sources.

The present disclosure also provides a payment interchange system and/or a method for operating a payment interchange that interacts with the global shopping cart and in which one or more payment methods have been established.

The one or more payment modes can provide payment from one or more purchasers and from one or more payment modes or sources, including purchasers and payment sources outside the country in which the global shopping cart is established.

There is further provided that the payment interchange system and/or a method for operating a payment interchange can interface with social media, or provide a user interface, so that selected aspects of the global shopping cart may be made available to family and friends.

The present disclosure also provides a merchant interchange system and/or a method for operating a merchant interchange that interacts with an online global shopping cart in which tasks, categories or themes for projects for which purchases are to be made, have been established.

The merchant interchange system and/or a method interacts with the global shopping cart to provide goods and services from multiple sources, including sources outside the country in which the global shopping cart is established.

The present disclosure provides a shopping cart interchange system and/or a method for operating a shopping cart interchange that interacts with an online global shopping cart to established categories for projects for which purchases are to be made.

The shopping cart interchange system and/or a method interacts with the global shopping cart to make purchases from multiple sources, including sources outside the country in which the global shopping cart is established.

There is also provided a shopping cart interchange system and/or a method that can interface with social media, or provide a user interface, so that selected aspects of the global shopping cart may be made available to family and friends.

There is provided a system and/or a method for managing data relationships between a global shopping cart and manager components that encompass data management access.

There is also provided a system and/or a method for data management in a global shopping cart that allows the owner or user of the global shopping cart to selectively obtain data in the quickest amount of time.

There is further provided a system and/or a method for managing data relationships between a global shopping cart and manager components that interface with various data stores in the global shopping cart.

There is still further provided that the managed data relationships between a global shopping cart and manager components include a merchant and partner data manager, a cloud data manager and a global shopping cart data manager.

The present disclosure provides a computer readable non-transitory storage medium storing instructions of a computer program that when executed by a computer system results in performance of steps for creating and operating a data management interface, a payment interchange, a merchant interchange, and a shopping cart interchange.

BRIEF DESCRIPTION OF THE DRAWINGS

A component or a feature that is common to more than one figure is indicated with the same reference number in each figure.

DESCRIPTION OF THE PREFERRED EMBODIMENTS

The following terms are used herein.

An entity is the owner of a global shopping cart. Entities may include, but are not limited to, a person, business, consortium of businesses (such as, by way of example, the businesses in a local shopping mall or businesses selling the same lines of products in different locations), school, club, fraternity or sorority, an organization having members in a particular trade or profession, sales representative for particular products, charity, not-for-profit organization, labor union, local government, government agency, or political party.

A task is something that is done on a one time or repetitive basis. A task can be a continuous endeavor, such as, for example, controlling inventory or office supplies. A task can be a project, such as, for example, planning a wedding, which can take a long period of time, approximately a year or longer, but is nonetheless contemplated to be a single event. A task can include a project, such as, for example, remodeling or redecorating a home or office, that can take several years.

An operator is an individual or an organization that operates a server that hosts one or more global shopping carts. An operator can be a payment network operator, such as MasterCard Incorporated, another business, or a consortium of businesses. However, it will be understood that there are other possible operators and types of global shopping carts, such as, for example, a mobile telephone company. There can be a mobile, global shopping cart that is analogous to a so-called m-commerce (mobile commerce) site. The mobile shopping cart is designed to operate with the resources available on a mobile device, such as, for example, a smart phone.

A user of a global shopping cart can be the entity or owner, or anyone authorized by the owner, including a merchant, to use the global shopping cart. For example, if the owner is an individual, that owner can authorize his or her family members (generally a spouse or an older child) or a particular merchant to use the global shopping cart. If the owner is a business, certain employees or other businesses in cooperation with the owner's business can be authorized to use the global shopping cart 300.

Figure 1:
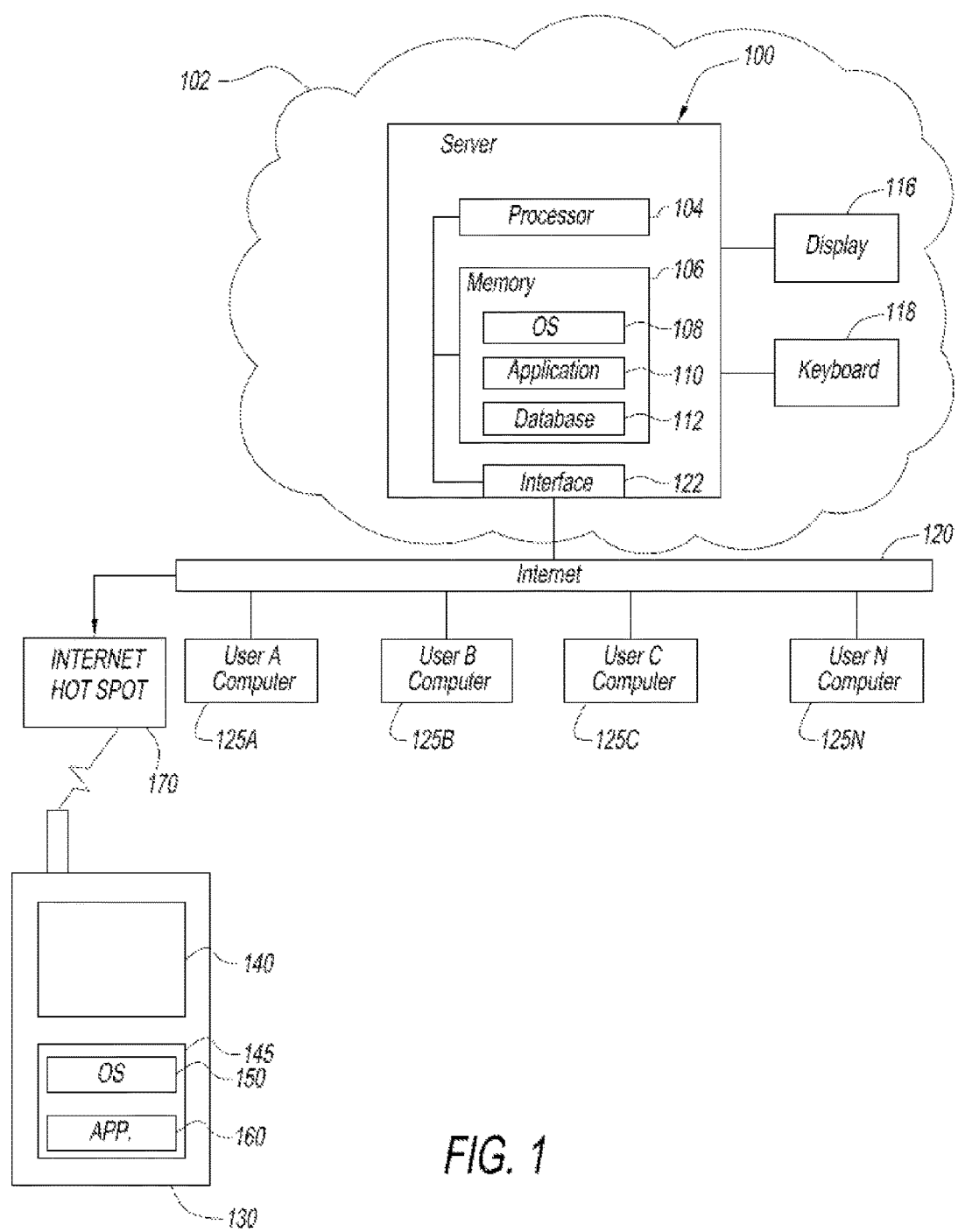
FIG. 1 is block diagram of system for implementing an exemplary embodiment of the present disclosure.

Referring to the drawings and, in particular, FIG. 1, a web site is operated on a server generally referred to as 100. The server 100 is in the cloud 102. Server 100 is connected to the Internet 120 by an interface 122. Server 100 includes a data processor 104 and a memory 106. Server 100 is connected to a display 116 and a keyboard 118. It will be understood that server 100 may have a number of other peripheral devices either customarily found in any computer, such as, for example, a CD or DVD drive (not shown), for placing programs on server 100 or for creating physical records of data processed by server 100. The peripheral devices are associated with or connected to server 100.

Memory 106 has a memory portion 108 for an operating system ("OS") for server 100, a memory portion 110 for one or more application programs, including one that is the subject of this disclosure, and a memory portion 112 used as the storage for a database, as more fully described below.

The data of the database stored in memory portion 112 can be stored in any type of memory, including a hard drive, a flash memory, a CD, a RAM, or any other suitable memory, with provisions for suitable backup as known in the art.

User or access computers 125A, 125B, 125C to 125N can access server 100 via a connection to the Internet 120, as described below.

The entity that operates server 100 can be a payment network operator such as MasterCard Incorporated. The operator can provide rules as to who can establish a global shopping cart. For example, a holder of a credit card issued by an issuing bank of the operator can establish a global shopping cart at no cost. There may be a modest fee for others who authenticate their identity, on a one time, monthly or yearly basis. If there is a minimum amount of purchasing activity initiated via the global shopping cart, the fee can be waived.

A mobile communication device 130, such as, for example, and not by way of limitation, a telephone, has a display 140 and can have a memory 145 for storing an operating system 150 and series of applications or applets therein. The series of applications or applets include an applet or application program (hereinafter an application) 160. Mobile communication device 130 can access server 100 via an Internet connected Wi-Fi hot spot 170 (or by any telephone network, such as a 3G or 4G system, on which mobile communication device 130 communicates) by using application 160. Application 160 can include MasterPass™ capability so that Internet purchases are quickly and easily completed. It is preferable that application 160 be a relatively thin application. Further, application 160 is preferably not particularly complex, so that operation on a mobile device, including those devices without great computing resources, is facilitated.

A cart or global shopping cart 300 in accordance with the disclosed embodiment is accessed by a user using a computer 125A, 125B, 125C to 125N, or a mobile communication device 130. Purchases can be made by a user or consumer using an access computer 125A, 125B, 125C to 125N, or by using mobile communication device 130. However, it will be understood that web site 100 may be accessed from a home or business computer, or a personal digital assistant, a game console, a home appliance such as, for example, a smart refrigerator, any other Internet connected communication device, such as, a tablet or other mobile device (for example, an ® tablet device or an ™ notebook computer device), or any stationary device, such as, for example, a kiosk.

The global shopping cart 300, once established, remains in effect for the life of the person who established it, and in some instances beyond, and also allows purchases to be made internationally. The global shopping cart 300, or the information contained therein, can, for example, become an asset of an estate. This can be especially applicable as between partners or spouses who often share at least some other joint assets. The global shopping cart 300 allows purchases to be made internationally. Aspects of global shopping cart 300 can be shared with others, such as family, friend, and colleague, to allow for their participation in special projects or long term projects. Thus, an invitee has the possibility of access to and serving, not only the creator of the global shopping cart 300, but also family, friends, invitees and anyone else, including other invitees, who is given access to the global shopping cart 300. An invitee can be, for example, a personal shopper for the individual who owns the global shopping cart 300. Other entities can be granted access to global shopping cart 300 to perform selected functions, as the owner of the global shopping cart 300 determines. The granted access will be managed by the owner of global shopping cart 300 by controlling the profile of the entity and with due regard for the privacy of the owner's data.

Access to global shopping cart 300 can include screening of data. A private area or page may be established, for example, for viewing by an invitee desired by the owner. The invitee can log on with, for example, a user name, password, and the telephone number of their personal mobile telephone. Security may be enhanced by using any security protocol that is currently used such as, for example, a personal phrase, a security question, an image, an e-mail address, a real time SMS PIN received from the global shopping cart 300, that must be entered to gain access, or any other security device or protocol.

Figure 2:
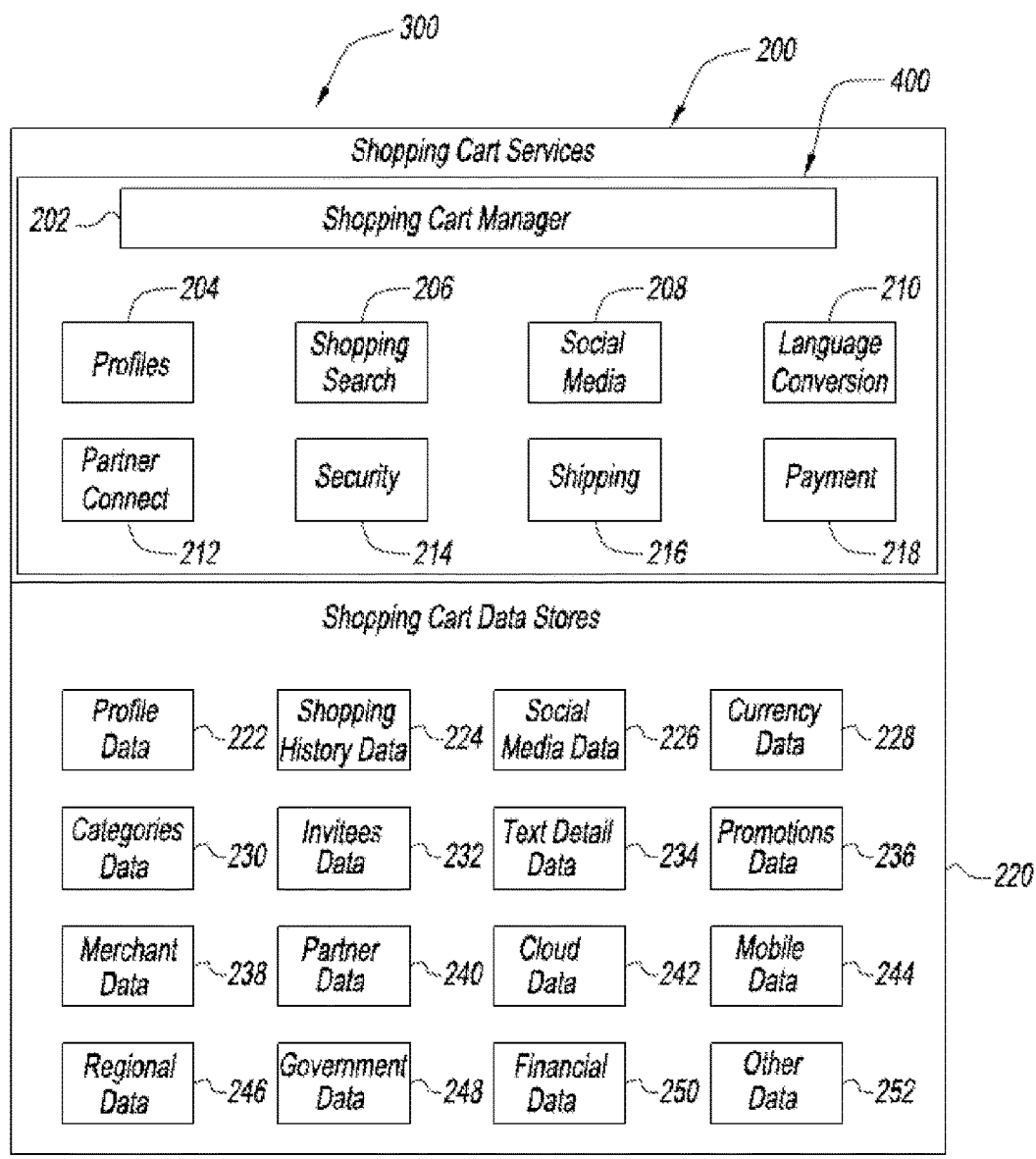
FIG. 2 is a diagram illustrating the components of an exemplary shopping cart in accordance the present disclosure.

Referring to FIG. 2, components of a global shopping cart 300 in accordance with the embodiment described herein are illustrated. An application on server 100 provides computer readable instructions for causing processor 104 (FIG. 1) to provide shopping cart services 200. After opening a browser, a log-on screen is displayed on the user's computer 125A. The user can be required to log on by using a user name and password. Alternatively, application 160 on mobile communication device 130 can provide automatic log on capability when application 160 is activated.

Referring still to FIG. 2, shopping cart services 200 include a shopping cart manager 202 that manages the shopping cart services, such as, for example, profiles 204 of shopping behavior, a shopping search function 206, social media 208, language conversion 210, partner connect 212, security 214, shipping 216, and payment 218. Profiles 204 of shopping behavior include, for example, attributes, such as, where shopping is done, whether it is on-line or in person, and amounts spent in various categories. Profiles 204 also include a user profile with the characteristics of the user, such as, for example, age range, income range, gender, and town of residence. Thus, a merchant's access to this information is valuable in establishing the merchant' products, services and inventory.

The managed services managed by shopping cart manager 202 are used in what is referred to herein as the shopping cart interchange 400. Shopping cart interchange 400 permits a user to interface to the server 100 to establish and use the global shopping cart 300. In the preferred embodiment, the managed services can be performed on the server 100 so that, as noted above, a simple browser or a thin application, on a mobile device accessing server 100 can be used as extensive computational resources on that device are not required. However, if a device with greater computational capability is available, a more complex application can be used to access server 100, and some of the functions of shopping cart interchange 400 can be performed on that device.

Shopping search function or manager 206 provides a shopping search function that includes electronic storage for items that have been selected for purchase, and information concerning the vendor, the price, a photograph, a video clip, lead time until shipment and other similar information. The shopping search manager 206 can make the purchases on-line via one or more appropriate web sites, can store the information needed to otherwise make the purchase, such as telephone information, or the exact location of a local store or product outlet.

Social media interface 208 supplies selected and non-confidential information to a selected social media web site that the user of global shopping cart 300 has joined, such as for example, Facebook®. Alternatively, an interface to a social media web site developed specifically for global shopping cart 300 can be used. In either case, the social media interface 208 will allow others, most preferably friends and family, but possibly a merchant, to participate in a project by offering suggestions, suggesting alternatives, and possibly even buying items, such as gifts, for the owner of global shopping cart 300.

Language conversion module 210 assists in international shopping activities. The word content of web pages can be converted to the language of choice of the global shopping cart owner.

Partner connect or connect function 212 is anyone other than the owner of global shopping cart 300, and thus could be a merchant or a merchant's designee, such as, for example, a personal shopper. Typically, a partner is a merchant or contractor who provides goods or services in connection with a category directed to a particular theme or project. Limited access is granted to that information required to complete a theme or project, or if the contractor is managing that theme or project, all relevant information. A contractor can send a message similar to a friend request. In response to that message, in some cases, or at the beginning of a relationship, read-only rights to the global shopping cart 300 may be provided. Later, the contractor can be given the right to provide comments. If the contractor is hired, full rights, including the right to make purchases to complete a project can be provided. This may be done by providing a screen, or portion of a screen, where appropriate boxes may be checked to provide different rights, or check marks removed to withdraw those rights. If there is any change in the task or category, an alert may be provided to the user of global shopping cart 300.

Security module 214 provides varying levels of security for global shopping cart 300. Security module 214 can include both secure and non-secure areas for various themes. A completely secure area is only accessible by the owner of shopping cart 300. Other areas or non-secure areas can be defined for joint access. Still other areas can be defined for shared or communal access. Each area can have a different level of security to which invitees may be granted access. For example, a secure area can include a wedding or home remodeling theme. An unsecured area may be one that is open for donations, such as, for example, for a local school event or a favorite charity.

Security measures can be put in place to assure that material that is uploaded to global shopping cart 300 is not done for illegal, immoral or other prohibited purposes. For example, filters can be used to block material that is pornographic, directed to illegal substances, or to other selected illegal activity, such as, for example, money laundering, terrorism, smuggling and making purchases with stolen credit card numbers. This can be accomplished in a variety of ways, including prohibiting transfer of data from certain web sites, or from web sites in countries where fraud is more likely, scanning content before it is posted, and checking for unusual activity, in a manner similar to that used for fraud alerts on credit cards. Analytics triggers can be used that would indicate suspicious shopping cart activity. Such an analytic trigger can be based on, for example, the number of people who have wide access to one or more sections of an individual person's cart. For example, if the purpose of a task is to plan a wedding, then twenty or perhaps no more than thirty people should be involved. If there are too many invitees, it is almost a certainty that proper security has not been maintained. Other indications that something improper may be happening include, but are not limited to, spending that does not fit the nature of the task or that is outside the usual spending patterns of the owner of the global shopping cart. Other examples of suspicious activity include transactions by the same individual originating in multiple geographic regions, and multiple sequential transactions with one merchant. Other problematic situations, while not illegal, include the posting of spam. This situation may prove distracting to invitees or cause them to be fearful of possible fraud, and discourage use of the global shopping cart. Anti-spam software, available from major software providers, can be used in conjunction with the global shopping cart to block access by known sources of spam. If there is inappropriate activity, or an obvious security breach, shopping cart activity can be suspended until the issue has been resolved.

Cart owners can establish a pre-configured donation area in their cart that reflects a summary of donations that they have made to other carts and within their own cart. This information can be summarized for budgeting and tax purposes.

The registration process for the global shopping carts 300 will include a name and address validation check, authentication of an e-mail address or cell phone number, credit card or bank account validation and a response to a visual access challenge such as that provided by Captcha or similar services. Multiple layers of validation checks are necessary to ensure authentication of the person to be granted access.

An invitee to a portion of global shopping cart 300 must register to gain access to the cart. Also, a registration is preferably required to assist in controlling unauthorized access by spammers and/or those seeking to commit fraud. Once registered, an invitee can review items in the area or areas of the carts to which the invitee has been granted access. Thus, this is beneficial to a merchant for many reasons besides the particular task. In accordance with the privileges granted, the invitee may be able to view one or more items, add items, change items, remove items, and add or view links or pictures, and such other analogous additions, deletions or changes. The access of an invitee may be terminated or limited by the owner of global shopping cart 300 at any time.

In general, the cart owner will control all aspects of security over the entire life of the owner or for the entire life of the global shopping cart 300. Major life changes for an individual, such as marriage, divorce, cohabitation, moving to another country, or death of a spouse or significant other, could potentially have a great impact on the configuration of the cart and the access rights to various areas. Analogous concerns may apply to an owner that is a business or other organization.

One or more global shopping carts 300 can be established by the various entities defined above. For example, a non-profit entity may wish to establish a shared or communal cart that any person can access to add a generic donation item and then enable payment for that item to be made. An entity could also post a wish list of items needed to accomplish its goals with the hope that others will provide the item, based on items already on hand, or based on a link to the item that is added to the cart so that it can be purchased for charity. An alert function can be provided so that a global shopping cart owner can opt-in to receive alerts for charities they have identified.

An entire cart or parts of a cart may be moved or copied from one global shopping cart 300 to another global shopping cart. This may be appropriate where global shopping carts 300 are established by entities, such as two or more businesses and a merger there between occurs. Where a home is being remodeled, access to that portion of the cart can be granted to the owner of another cart to use as a template. One advantage to the recipient carts is that access could be granted to the invitee list for that portion of the cart, which may include professional contacts, such as remodeling companies, city or county permit contacts, or other contacts pertinent to accomplishing the task for which that portion of the cart was created.

A shared space or communal area of global shopping cart 300 can be configured to be open to anyone. A cart owner can create an area for purchase of a used automobile and within that area provide some criteria for the item to be purchased, such as make, model, accessories, mileage requirements, pictures illustrating the desired color, and any special features. A price range for the item that states how much the cart owner is willing to pay can also be specified. Anyone accessing the shared space can search the network of carts having a shared or communal area for the listed item, and offer a response or provide a link, pictures or contact details to propose an item for purchase by the cart owner. The cart owner may accept or decline such proposals. As used herein, purchase means some reciprocation in value whether it be an equal value or agreed upon value. Thus, purchase can be in the form that includes, but is not limited to, money, barter, gift certificate and point program.

Shipping module 216 manages and keeps track of items that have been ordered and their location in the shipping network, as advised by the various carriers. Item tracking numbers are followed. Alerts provided by the shippers can be forwarded to the owner of the cart by various "push technologies" including, but not limited to, e-mail, voicemail, and instant messenger. Alternatively, the owner of the cart, or a person who has been granted access to the cart, can access the cart and bring up a page or an API on the accessing device, and check current status. The shipping module can also be used to compute or keep track of shipping costs, which for purchases from distant vendors, may make a difference as to whether a particular purchase is made, or whether it is made from that vendor.

Payment module 218 provides for payment for any items purchased in the global shopping cart 300. Payment module 218 can have the characteristics of one or more payment modes or sources, e.g., digital wallet, and may allow access to a plurality of accounts or funding sources. When purchases are made, acknowledgements of or receipts for the purchases may be managed by payment module 218. In the case of international purchases, currency computations, as described below, and shipping costs, as described above, may also be managed.

Payment module 218 includes a payment interchange 500 (shown in FIG. 5) in accordance with the present disclosure. The global shopping cart 300 has a flexible application programming interface (API) framework sufficient to support the payment interchange including the payment function 510 for paying for an item to be purchased by one or more users of the global shopping cart and by one or more payment modes or sources 520.

In accordance with this disclosure, the global shopping cart 300 offers a flexible API framework to accept payments from any number of sources. The cart owner can pay via traditional electronic means including credit, debit, GRP, as well as ACH. Additionally, the API framework provides the capability to link to other wallets and allow the ability to pay with wallets such as MasterPass™ Google™ wallet, PayPal™, C-SAM™, ISIS™, Amazon™ payments, V.me™, and the like. The API can also support an interface to accept non-traditional modes or sources of payment such as Amazon virtual currency, paying with rewards points, bitcoin, virtual card numbers, and the like.

The cart owner can also post items for "swap" or "barter" in the public section of their cart with the notation that they are willing to make a connection for some other type of good or service or are open to any offer from any source. The two parties involved in a swap would need to agree on the value of the items to be swapped, and in case of a price difference, provide a 'top up' of any difference in the amount through one of the other payment methods. Additionally, the cart owner could send a notification or invite out to a known person or group of people to invite them to look at the item(s) and offer up an item(s) to swap with. Alternatively, they could offer a more traditional bid of money for the item offered.

Cart owners can define which payment method is their "default" method of payment to speed the checkout process. However, at any time that payment method can be changed by the cart owner. It can be changed for a one time purchase or the default payment method can be changed. If the merchant accepts split ticket, the cart owner can set up a default card and then a secondary payment method so that payment can be made for an item via two (or more) different payment modes or sources. The cart owner can also set up a split ticket with another person's payment device. For example, a bride and her mother can split the cost of a wedding dress. They buy the dress online and the cost is split between the cart owner/daughter's credit card and the mother's debit card.

The cart owner will be able to change payment preferences via the dashboard from any device (phone, computer, tablet, etc.) at any time by signing into the cart.

Depending on the source of payment, such as with a credit or debit card, the traditional payment process of authorization/clearing/settlement is adhered.

Closed loop networks can be accessed depending on the payment option selected, such as, for example, with a private label card, or store credit.

All payment options selected and utilized for a purchase will be summarized in the cart for the owner to review as part of their normal statement and spending reconciliations.

In accordance with this disclosure, a cart owner can leverage the ability to purchase an item through their cart and where available, pick up an item at a location versus having it shipped to them. Also, the cart owner can purchase an in-store item and check out in the aisle using any of the common methods available through digital wallets or alternate payment schemes at participating merchants.

The global shopping cart of this disclosure utilizes state of the art security in storing the log-in credentials and provide for 'remember me' capability, support for the various payment authentication methods, and has the capability of conforming to new API interfaces as they become available. Also, the global shopping cart of this disclosure includes a payment API having a flexible framework, thereby anticipating other payment options. This allows for many unused fields to account for the eventual introduction of biometric payments, enhanced mobile payment functions through for example the camera and geo-location, access through new form factors, such as watches, rings, eye glasses, hand or body gestures in coordination with a mobile or other form factor, and enhanced virtual currencies.

Figure 5:
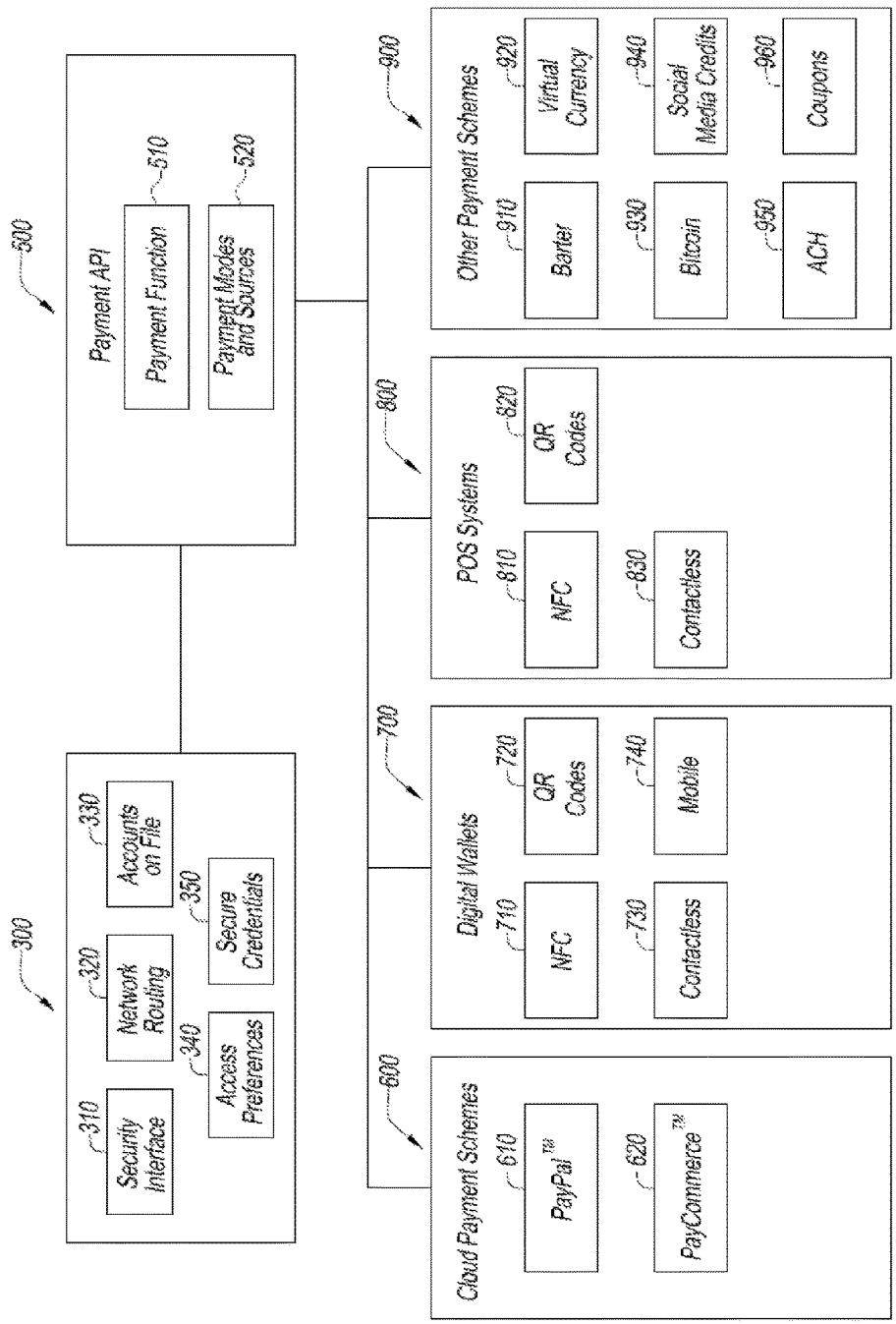
FIG. 5 is a diagram illustrating the components of an exemplary payment interchange (payment API) that can be used with the global shopping cart of FIG. 2.

Payment module 218 having payment interchange 500 shown in FIG. 5 can have the characteristics of one or more payment modes or sources including cloud payment schemes 600, digital wallets 700, point of sale (POS) 800, and non-traditional modes or sources of payment 900. Illustrative cloud payment schemes 600 include, but are not limited to, PayPal™ 610, and PayCommerce™ 620. Illustrative digital wallet sources 700 include, but are not limited to, near field communication (NFC) 710, quick response (QR) codes 720, contactless 730, and mobile 740. Illustrative point of sale (POS) sources 800 include, but are not limited to, near field communication (NFC) 810, quick response (QR) codes 820, and contactless 830. Illustrative non-traditional modes or sources of payment 900 include, but are not limited to, barter 910, virtual currency 920, bitcoin 930, social media credits 940, automated clearing house (ACH) 950, and coupons 960. Other illustrative non-traditional modes or sources of payment include, but are not limited to, biometric payments, enhanced mobile payments through a camera or geo location device, payments through a form factor comprising a watch, ring, eye glasses, hand or body gestures in coordination with a mobile or other form factor, and enhanced virtual currency.

Referring to FIG. 5, the global shopping cart 300 has a flexible application programming interface (API) framework sufficient to support the payment interchange 500 including the payment function 510 for paying for an item to be purchased by one or more users (e.g., shared payment arrangement by multiple users/invitees) of the global shopping cart and by one or more payment modes or sources 520 (e.g., multiple different payment modes or sources). The needs of the users and owner of the global shopping cart 300 dictate the types of payment (e.g., shared payment arrangement by multiple users/invitees) and various payment modes and sources (e.g., multiple different payment modes or sources) supported by the API framework.

Referring again to FIG. 5, in support of payment interchange 500, the global shopping cart 300 can include, but is not limited to, a security interface 310, network routing 320, accounts on file 330, access preferences 340, and secure credentials 350.

Data required for the operation of global shopping cart 300 is stored in shopping cart stores 220 (shown in FIG. 2). The data in the cart stores 220 are stored in a format that makes it available for or translatable to other database technologies that may be developed in the future. This is of particular importance since the amount of data that must be retained and managed will be very large over the lifetime of global shopping cart 300. There are various forms and formats for storing the data in shopping cart stores 220. A preferred format can be an open source format. However, the various storage modules for the different kinds of data that are stored, are described below.

Referring back to FIG. 2, profile data 222 stores the data for the profile or profiles created at 204. As noted above, a user profile with the characteristics of the user, such as, for example, age range, income range, gender, and town of residence, can be stored. If global shopping cart 300 is shared, the profiles of more than one person can be stored, such as that of family members authorized to use global shopping cart 300. A dollar limit on the spending of a minor child may also be stored as part of a profile. Shopping behavior, such as where shopping is done, whether it is on-line or in person, and amounts spent in various categories, can also be components of a user profile.

Shopping history store 224 includes data or information on the items that have actually been purchased. Such data includes, but is not limited to, SKU number, price paid, where purchased, when purchased, method of purchase, source of funds, and type of purchase. This data may be used to as part of the formulation of profile 204 stored in profile store 222.

Social information store 226 includes information used by social media interface 208. Social media interface 208 interfaces with social media platforms, and information derived from social media web sites. This information may be used to access existing social media, or a social media site specifically intended to and designed for interaction with global shopping cart 300.

Currency store 228 contains a database of currency exchange rates, as well as currency exchange fees charged by the various sources of funds used by payment module 218. These rates and fees can be updated on any periodic (for example, daily at 5:00 PM local time) basis by accessing various pertinent web sites and by downloading the information contained therein. A real time data service may be used to calculate or recalculate the exchange rates at the time a purchase is made. These rates and fees, as well as shipping costs, are of material assistance to anyone using global shopping cart 300 in evaluating the actual cost of an item, and in making a decision whether the item should be purchased from a particular source or, perhaps, whether it should be purchased.

Categories store 230 is used to store the items purchased by kind or type. This storage can be based in part on SKU numbers, or can be stored in categories as created by the owner of the cart. In one embodiment, the creation of categories by the owner can be based on the themes established, such as remodeling of a home or a wedding. The storage by categories or themes enables the owner to track the allocation of funds for various purposes.

Invitees store 232 stores the security data mentioned that is obtained when invitees register for access to a portion of global shopping cart 300. In particular, the information required to establish the various levels of security is stored.

Text detail store 234 is used to store textual information. Textual information includes, but is not limited to, notes, one or more pictures, photographs, and links to web sites, audio and video files relating to items selected for inclusion in global shopping cart 300, and items suggested for inclusion by invitees. If the space required for the linked items is included, text detail store 234 can be quite large in terms of the storage resources required for all information.

Promotions store 236 stores data relating to various sales promotions or discounts provided by vendors of goods in global shopping cart 300. The existence and nature of these items may be periodically updated by accessing the web sites of vendors of items in global shopping cart 300 (whether or not a purchase has been made) by interfacing to the shopping cart owner's e-mail to look for promotions or discounts, or by manually entering data at an appropriate screen based on information received elsewhere, such as by mail. Advantageously, the dates of expiration of these promotions or discounts can also be stored so that an alert can be sent to the owner of global shopping cart 300, any desired time prior to expiration, such as a day or week prior to expiration. This alert gives the owner an opportunity to decide whether to make the purchase at a time that takes advantage of the promotion or discount, or to wait anticipating a better promotion or discount may later be available.

Merchants data store 238 stores data and information relating to goods and services from various merchants, including merchants outside the country in which the global shopping cart is established. The store can include rewards offered by a particular merchant, such as those rewards generated by repeat business or purchases greater than some predetermined value. Coupon and promotional codes can also be stored. The data associated with a particular promotion, including the effective date and expiration date, can automatically be uploaded to global shopping cart 300.

Partners data store 240 stores data and information relating to partners and projects that they may be involved with, currently or in the past. A partner is anyone other than the owner of global shopping cart 300, and thus could be a merchant. Typically, a partner is a merchant or contractor who provides goods or services in connection with a category directed to a particular theme or project. Data and information are stored relating to a theme or project. This data may be used by partner connect 212.

Cloud data store 242 stores data and information from public and private clouds. For example, cloud data store 242 can include stored mobile data (many mobile devices do not allow storage of sensitive or are designed to handle huge data downloads), regional data (international data stored locally in a country for example), partner data, profile data, social media, historical data, image and video (large blob types of data), and government data. The data in this environment may include data that is interconnected with other data stores.

Mobile data store 244 stores data and information from mobile devices. For mobile devices that do not allow storage of sensitive or are not designed to handle huge data downloads, such data and information can be included in cloud data store 242.

Regional data store 246 stores data and information for specific geographic locations. For example, regional data can include international data stored locally in a country. This data and information can be useful, for example, in conducting business in a particular country or travel in a particular country.

Government data store 248 stores data and information from government sources that may be useful, for example, in conducting business in a particular country or travel in a particular country. The government data can include international data as well as domestic data.

Financial data store 250 stores data and information relating to finance including international finance, domestic finance as well as personal finance. The international and domestic finance data can include world markets, stock markets, currency exchange (which can also include currency data store 228), and the like. The personal finance data can include personal investment portfolios, savings, checking, and the like. This data and information can be updated on any periodic basis using the crawling function as described herein.

Other data stores 252 can also be included. Other data storage options such as advanced cloud storage capabilities, closed networks and government networks may result in other data stores 252.

Figure 3:
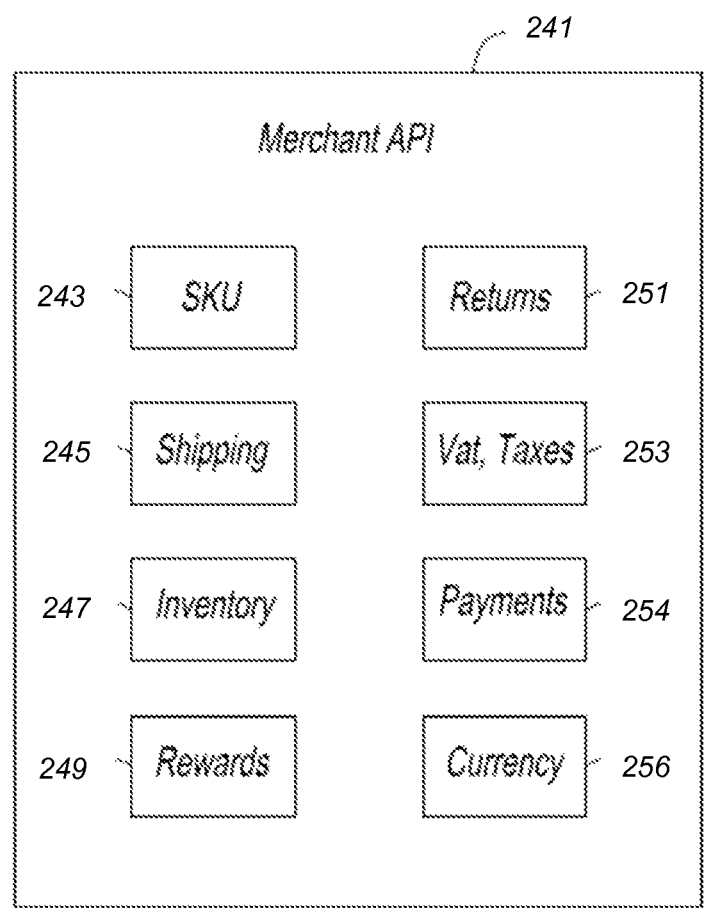
FIG. 3 is a diagram illustrating the components of an exemplary merchant API that can be used with the global shopping cart of FIG. 2.

Referring to FIG. 3 a merchant API 241 interacts with shopping cart services 200 of FIG. 2. Merchant API 241 can be more complex than an application on a mobile device since it is expected that the merchant will have access to a device with greater computational resources. The merchant can use merchant interchange 310 for internal management purposes including, but not limited to, management of inventory, management of SKU level information, quantity of items, colors, sizes, seasonal buying habits, location of the items, velocity of inventory, price fluctuations to determine future price points, quantity of items bought in store verses shipping information, determining the proclivities of the owner and invitees on the global shopping cart, shopping preferences, including but not limited to preferred locations, preferred styles, color palette, sizes, household profile including family makeup, professional preferences, casual preferences, vacation preferences, travel preferences, lifestyle preferences, fashion preferences, brand and logo preferences, sporting preferences, leisure preferences, and social causes/political preferences Merchant API 241 will, in general, be on one of computers 125A to 125N of FIG. 1 that can be desktop computers. Specifically, merchant API 240 interacts with an online global shopping cart in which tasks, categories or themes for projects for which purchases are to be made, have been established. Further, merchant API 241 interacts with online shopping cart services 200 of FIG. 2 to provide goods and services from multiple sources, including sources outside the country in which the global shopping cart is established.

Merchant API 241 includes an SKU store 243 that includes a list of all items that have been and currently are in inventory. A shipping manager 245 is used to manage the shipment of items that have been ordered, including the manner of shipment, the carrier being used, and the costs to the purchaser. The manner of shipment includes, but is not limited to, parcel post, regular mail, air shipments, courier, digital delivery or download, in-store pick up, pick up at another location, such as a distribution center, a location found by doing an Internet search with a smartphone, or any location where the recipient is or will be at a given time.

An inventory control module 247 automatically keeps track of inventory that has been sold and/or shipped so that the merchant can place orders for additional inventory, as desired. Inventory control module 247 requires input on the kind and quantity of new items added to inventory. Provisions can be made for accounting for minimum and maximum quantities that should be on hand and order lead times, so that the merchant has adequate inventory to meet customer demands for that item. Access to the global shopping cart 300 may provide the merchant with the proclivities of the owner and invitees, and thus the merchant may have better information to better understand inventory needs, as well as potential future products that would be desirable to the owner or invitees of the global shopping cart 300.

A rewards or rewards management module 249 can track rewards for a particular customer, such as those rewards generated by repeat business or purchases greater than some predetermined value. Coupon and promotional codes can be authenticated and processed. Rewards management module 249 can send alerts to owners of global shopping cart 300 of a new promotion, as it becomes available. If a business relationship already exists, or permission is provided, the data associated with a particular promotion, including the effective date and expiration date, can automatically be uploaded to global shopping cart 300.

Returns 251 stores data related to returned items.

VAT and taxes module 253 automatically adds the required value added and other taxes in computing the price that the owner of global shopping cart 300 must pay for the purchased item or items. A table of required taxes can be maintained, and the amount charged to the customer based on the location to which the item or items are being shipped, and the local tax rate on that type of item. A computation can be made as to the amount owed to each taxing authority to facilitate required payments.

Payments module 254 calculates the precise amount that the owner of global shopping cart 300 must pay for the ordered item or items. The price of the item, the proper taxes from VAT, taxes in tax module 253, and shipping costs in shipping module 245, are summed. The value of rewards or promotions is subtracted from the sum to compute the final price owed. When the customer offers payment, a determination is made as to whether the mode of payment is satisfactory to the merchant. If the mode of payment is satisfactory, the payment is deemed accepted, and shipment can be made.

A currency module 256, with data similar to that in currency store 228, has a database of currency exchange rates and currency exchange fees charged by the various currency exchanges. These rates and fees can be updated on a daily basis by accessing various pertinent web sites and by downloading the information contained therein. This updating assists the merchant in deciding if a particular currency that is offered for an item by a user of global shopping cart 300 should be accepted.

Certain features of the merchant API 241 may have applicability for use in circumstances not connected to global shopping cart 300. For example, rewards management module 249, VAT and taxes module 253, payments module 254 and currency module 256 can be used on other platforms. Again by way of example, VAT and taxes module 253 can be used as a stand-alone service. One use of such stand-alone service can be the recovery of VAT taxes from a government entity, when permitted by law.

Figure 4:
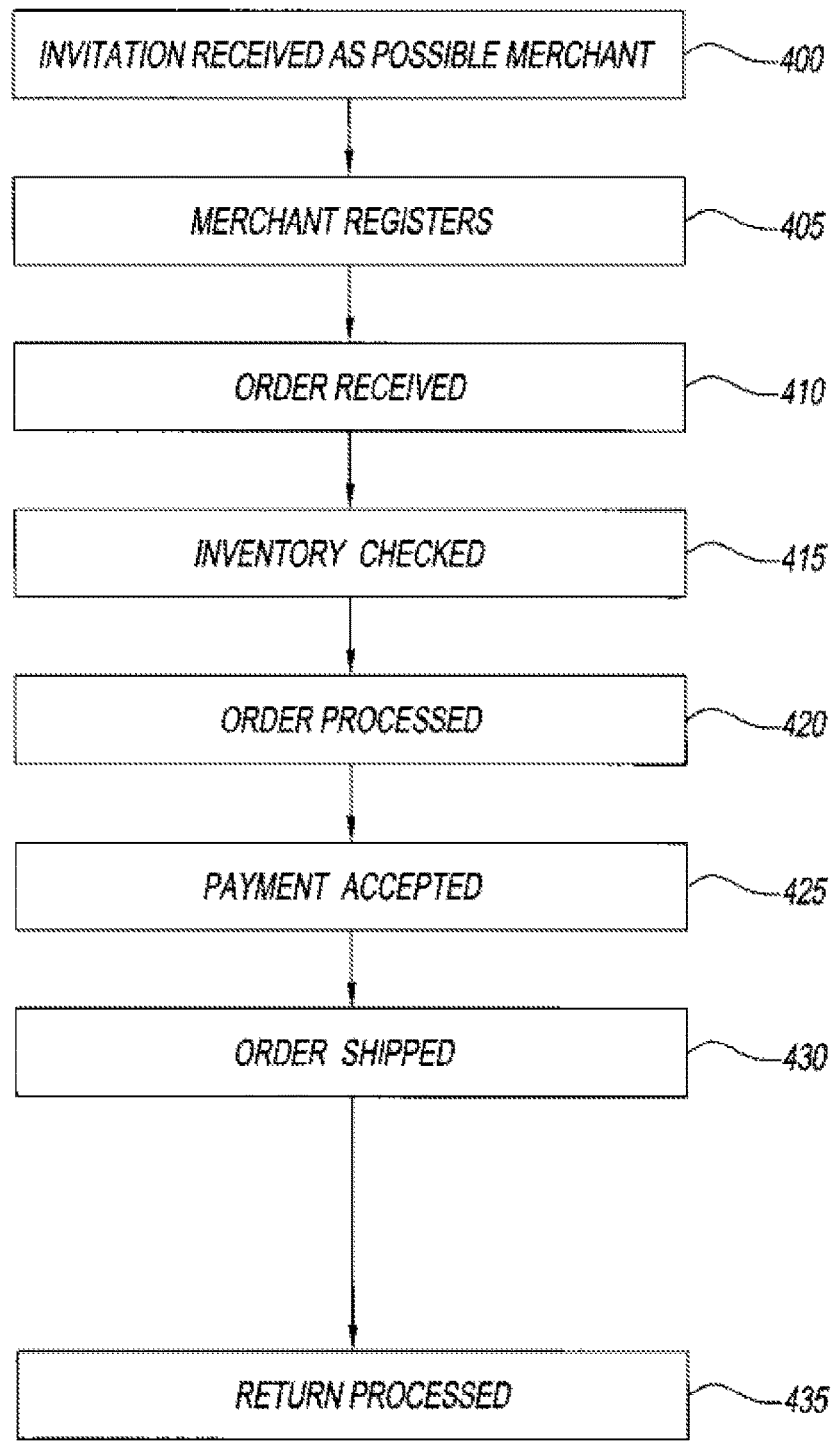
FIG. 4 is a flow chart of the use of the merchant interchange of FIG. 3

Referring to FIG. 4, it is a flow chart of the use of merchant interchange 310 of FIG. 3. At 400, an invitation is sent to a merchant. The invitation is that there is a possible source of an item listed in a task, category or theme in global shopping cart 300. At 405, the merchant registers in the same manner as any invitee registers in global shopping cart 300. When the owner of global shopping cart 300 makes a purchase of an item, at 410 an order is received by the merchant. At 415, the merchant checks inventory. In the event the item is not in inventory and will not be available in some reasonable amount of time, the merchant may access global shopping cart 300 to leave a message to that effect and to ascertain whether the delay in shipment is acceptable. The merchant may also leave a message that the item is not in inventory but will be available shortly. It is envisioned that precision as to when the item will be available can be provided.

If inventory is available, or the delay in shipment is acceptable, the order is processed at 420. At 425, payment from the owner of global shopping cart 300 is accepted. At 430, the order is shipped. At a later time, if for some reason the shipment was not accepted by the customer and the item that was ordered is returned, the return is processed at 435.

There are several advantages to providing a merchant with access to the task, category or theme established in global shopping cart 300. The merchant will be aware of the general nature of the project. With that knowledge, the merchant can make suggestions for its successful completion, including but not limited to, comments on the quality or suitability of listed goods, suggestions for alternative items, leaving a message to advise of the dates of availability of a promotion or reward, and recommendations for contractors to assist in the completion of the project. These suggestions can include any of the items that any invitee may contribute, and in addition to being in text format can be a link to a web page, an image, an audio file, and a video file. Thus, trusted merchants or contractors may be active participants in the project.

Merchants can be vetted to be sure that they are legitimate businesses. For example, a merchant can be asked to provide a tax identification number that can be validated by, for example, the acquiring bank with which the merchant conducts business. Policies can be provided when a merchant logs on to the global shopping cart 300 by, for example, screens that state that no proxies for illegal businesses can use the global shopping cart 300, and to remind the merchant of use policies for specific payment services, such as for digital wallets.

The merchant can also use merchant interchange 310 for various internal management functions. For example, in accordance with a multilevel access approach, certain personnel may be permitted only read only access, others to conduct customer transactions, and still others to order inventory, in value up to a specified purchase price, when inventory records indicate that inventory must be replenished.

Figure 6:
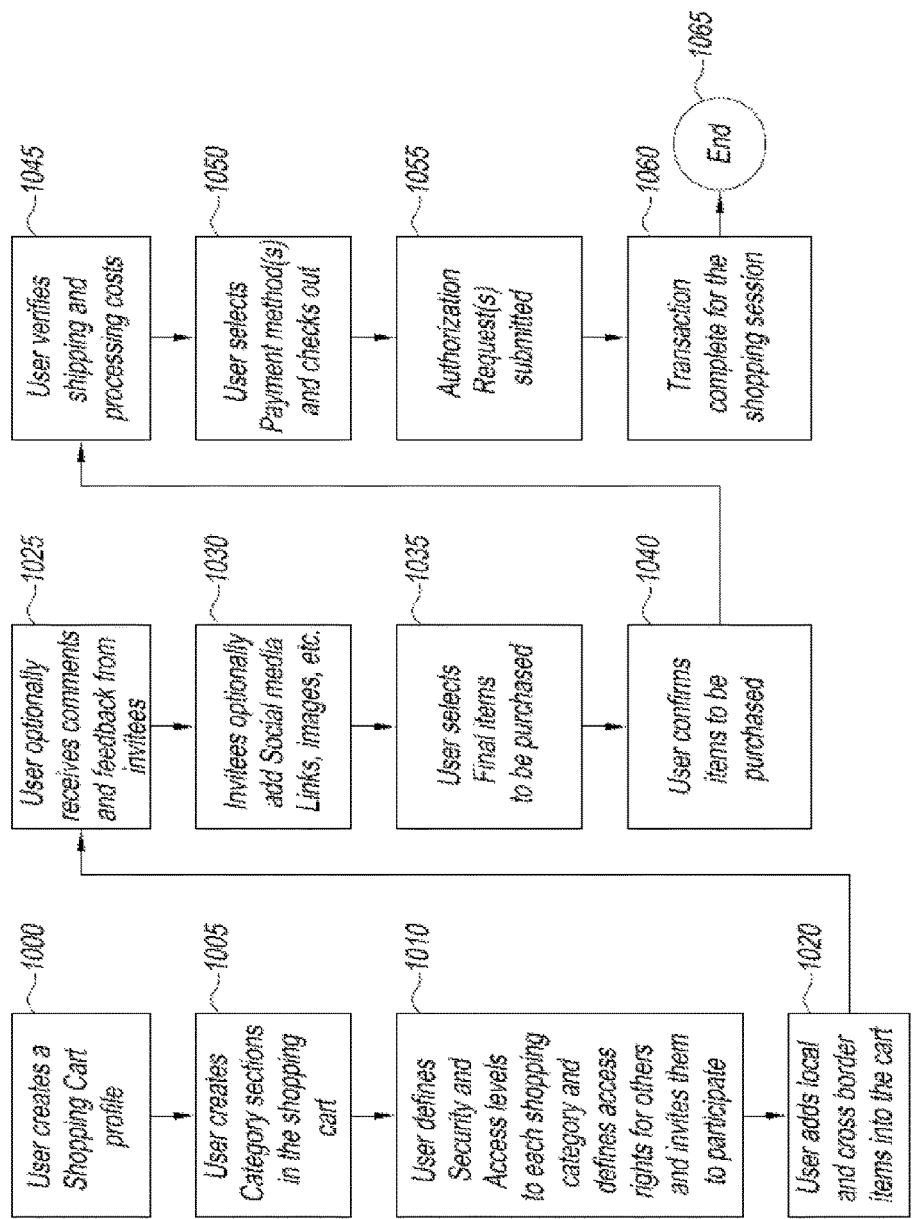
FIG. 6 is a flow chart representing the manner in which a consumer first uses the shopping cart interchange to access the system of FIG. 1.

FIG. 6 illustrates the steps in using the shopping cart interchange 400 of FIG. 2 for the creation and initial utilization of global shopping cart 300. At 1000, the owner or someone authorized by the owner to use global shopping cart 300 (hereinafter collectively or separately referred to as a user) creates a profile for local shopping cart 300 by connecting to server 100 of FIG. 1. This operation may be accomplished by a mobile device or computer connection.

At 1005, the user creates category sections in global shopping cart 300. As an alternative, a set of default categories or themes can be made available for selection by the owner of global shopping cart 300.

At 1010, the user defines security and access levels for each shopping category or theme and defines access rights for others. A message is sent to others inviting them to participate in each category or theme via e-mail, or via social media interface 208 of FIG. 2.

At 1020, the user of global shopping cart 300 can add items to be purchased either in the country from which the cart was created or from sources outside of that country. These items can be purchased individually, or can be added under a theme that was created. At 1025, the user can receive feedback from the invitees. This feedback can also be accomplished at 1030 by the invitees adding social media links and sending data including, but not limited to, comments, images, and links via social media interface 208. The invitees can conveniently add an item, such as, for example, one in a store, by using a mobile telephone to acquire an image of a bar code on that item, and uploading that image to the theme area of global shopping cart 300.

At 1035, the user selects the final set of items to be purchased for a particular theme. At 1040, a confirmation of the items to be purchased is made by the user. At 1045, shipping and processing costs, including currency exchange rates and fees, and taxes are verified. At 1050, the user selects a payment method or methods, including, but not limited to, credit card, debit card, an electronic draft on a checking or other account, or social media credits. Different items may be paid for by different funding sources, or an item may be paid for by a combination of funding sources. At 1055, authorization requests are submitted for the various sources. At 1060, the transaction or transactions are complete, and various acknowledgement receipts, including electronic receipts for the purchases are received. This completes the shopping session. The user ends the session at 1065 by logging out or closing the application being used.

Figure 7:
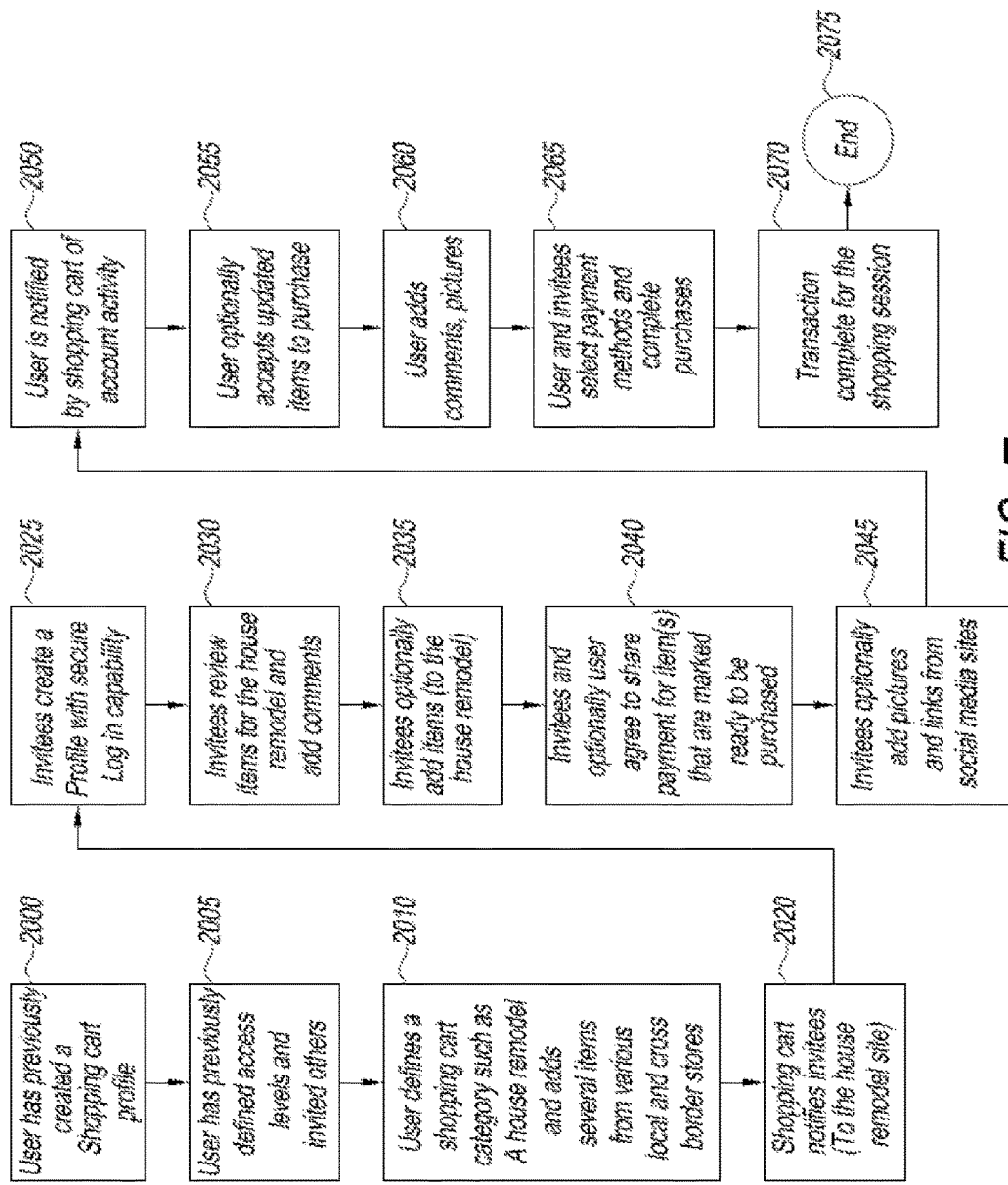
FIG. 7 is a flow chart representing the manner in which a consumer uses the shopping cart including the payment interchange of the present disclosure after the global shopping cart including the payment interchange has been created.

FIG. 7 illustrates the steps in using the payment interchange in the subsequent utilization of global shopping cart 300. At 2000, the user accesses a previously created global shopping cart 300. The user has previously defined access levels and invited others at 2005. A shopping cart category or theme, such as the remodeling of a house, has been defined. The user at 2010 defines a shopping cart category and adds items to be purchased in the country of origin and abroad.

At 2020, global shopping cart 300 notifies one or more invitees of the availability for visit of the house remodeling category as a web page in global shopping cart 300. At 2025, the invitee creates a profile with secure log in capability. At 2030, the invitee reviews items in the category or theme, such as the house remodeling project, and add comments. At 2035, the invitee can add items to the house remodeling project or pay for items that have been marked ready to be purchased. At 2040, the invitees and optionally user agree to share payment for selected items to be purchased. The invitees and user may agree to share in the purchase of an item (e.g., kitchen remodeling). At 2045, the invitee can add images and links from social media sites. At 2050, the user is notified by global shopping cart 300 of any activity of the invitee, or of selected activities designated by the customer. However, as a default, the user is always notified of purchases made by each invitee so that appropriate acknowledgements and a thank you note can be sent.

At 2055, the user can accept updated items to purchase, as suggested by the invitee. At 2060, the user adds images or comments to the theme or category. At 2065, a purchase can be completed by the user as described above with reference to FIG. 5. The user and optionally invitees agree to share payment for selected items to be purchased. The user and optionally one or more invitees may agree to share in purchase of an item (e.g., a wedding dress). The user and optionally invitee(s) who agree to purchase then select a payment method or methods, including, but not limited to, credit card, debit card, an electronic draft on a checking or other account, or social media credits. Different items can be paid for by different funding sources, or an item can be paid for by a combination of funding sources. At 2070, the transaction for the shopping session is completed. The user ends the session at 2075 by logging out or closing the application being used.

Figure 8:
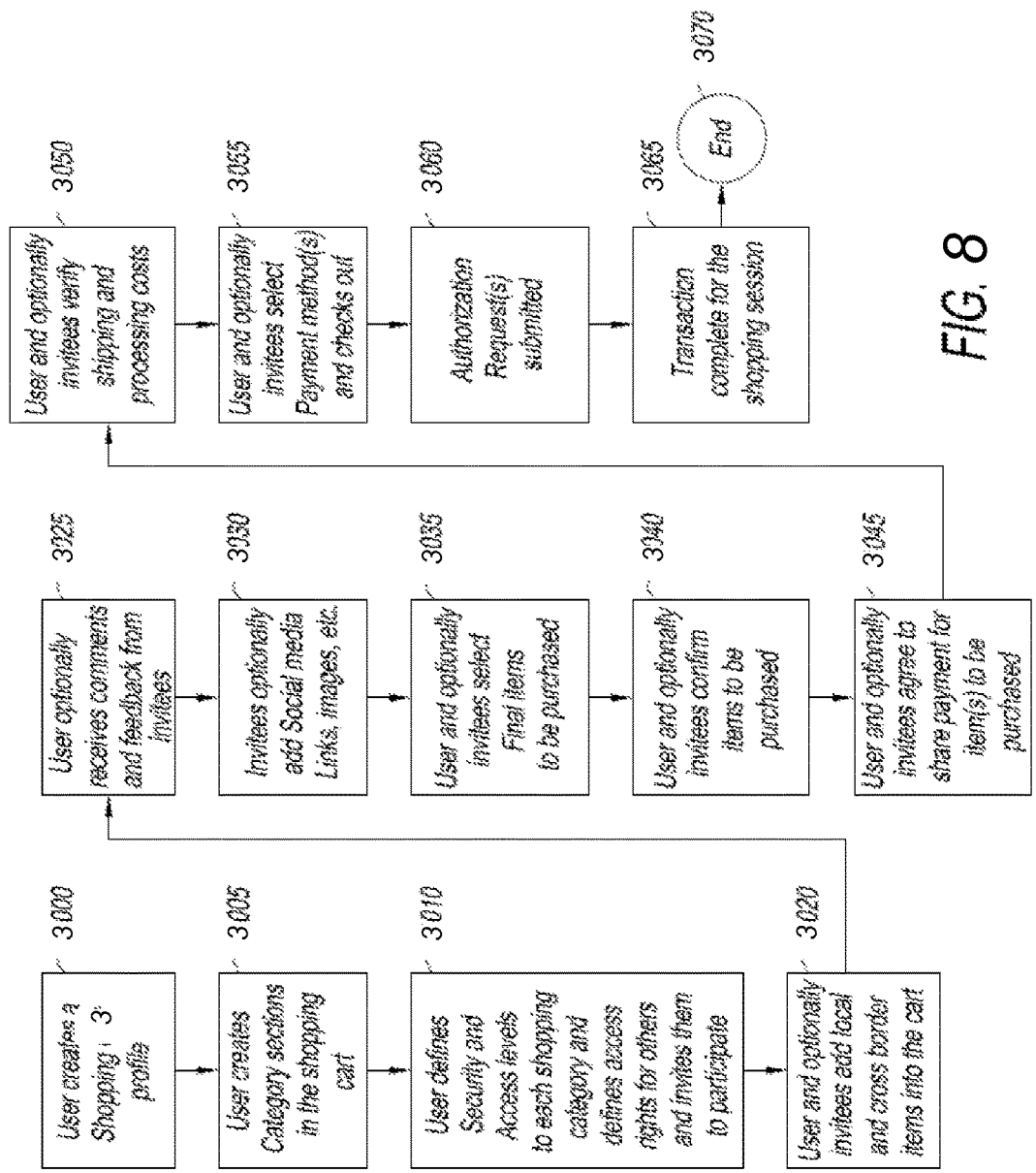
FIG. 8 is a flow chart representing the manner in which a consumer first uses the shopping cart including the payment interchange of the present disclosure.

FIG. 8 illustrates the steps in using the payment interchange of this disclosure in the creation and initial utilization of global shopping cart 300. At 3000, the owner or someone authorized by the owner to use global shopping cart 300 (hereinafter collectively or separately referred to as a user) creates a profile for local shopping cart 300 by connecting to server 100 of FIG. 1. This operation can be accomplished by a mobile communication device or computer connection.

At 3005, the user creates category sections in global shopping cart 300. As an alternative, a set of default categories or themes can be made available for selection by the owner of global shopping cart 300.

At 3010, the user defines security and access levels for each shopping category or theme and defines access rights for others. A message is sent to others inviting them to participate in each category or theme via e-mail, or via social media interface 208 of FIG. 2.

At 3020, the user and optionally invitees of global shopping cart 300 can add items to be purchased either in the country from which the cart was created or from sources outside of that country. These items can be purchased individually, or can be added under a theme that was created. At 3025, the user can receive feedback from the invitees. This feedback may also be accomplished at 3030 by the invitees adding social media links and sending data including, but not limited to, comments, images, and links via social media interface 208. The invitees can conveniently add an item, such as, for example, one in a store, by using a mobile telephone to acquire an image of a bar code on that item, and uploading that image to the theme area of global shopping cart 300.

At 3035, the user, and optionally invitees, select the final set of items to be purchased for a particular theme. At 3040, a confirmation of the items to be purchased is made by the user (and/or optionally invitees). At 3045, the user and optionally invitees agree to share payment for selected items to be purchased. The user and optionally one or more invitees may agree to share in purchase of an item (e.g., a wedding dress). At 3050, shipping and processing costs, including currency exchange rates and fees, and taxes are verified. At 3055, the user and the optionally invitee(s) who have agreed to purchase then select a payment method or methods, including, but not limited to, credit card, debit card, an electronic draft on a checking or other account, or social media credits. Different items can be paid for by different funding sources, or an item can be paid for by a combination of funding sources. At 3060, authorization requests are submitted for the various sources. At 3065, the transaction or transactions are complete, and various acknowledgement receipts, including electronic receipts for the purchases are received. This completes the shopping session. The user ends the session at 3070 by logging out or closing the application being used.

Figure 9:
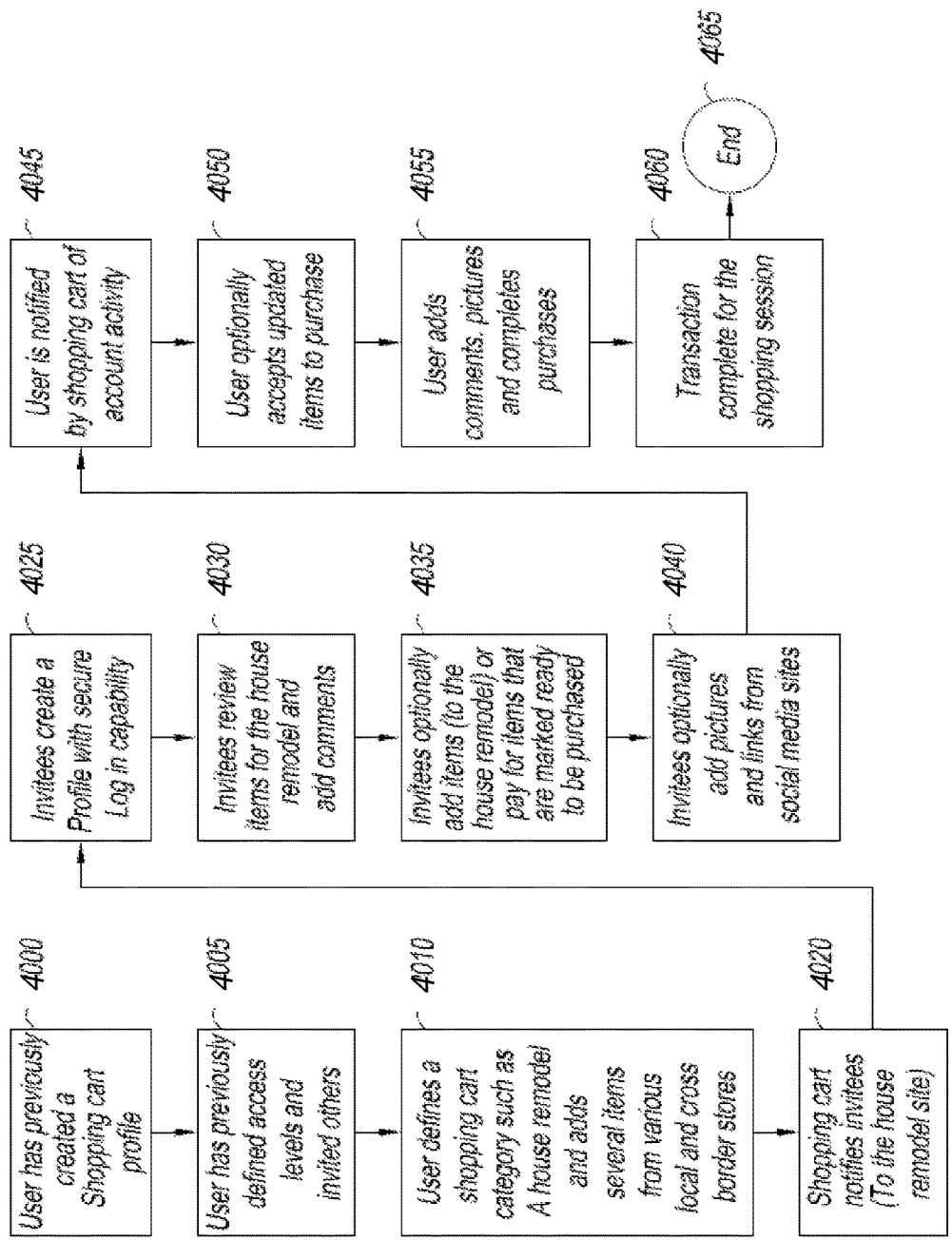
FIG. 9 is a flow chart representing the manner in which the shopping cart interchange is used to access the system of FIG. 1 after a global shopping cart has been created.

Referring to FIG. 9, shopping cart interchange 400 of FIG. 2 is used by the customer, at 4000, to access a previously created global shopping cart 300. The user has previously defined access levels and invited others at 4005. A shopping cart category or theme, such as the remodeling of a house, has been defined. The user at 4010 defines a shopping cart category and adds items to be purchased in the country of origin and abroad.

At 4020, global shopping cart 300 notifies one or more invitees of the availability for visit of the house remodeling category as a web page in global shopping cart 300. At 4025, the invitee creates a profile with secure log in capability. At 4030, the invitee reviews items in the category or theme, such as the house remodeling project, and add comments. At 4035, the invitee can add items to the house remodeling project or pay for items that have been marked ready to be purchased. At 4040, the invitee can add images and links from social media sites. At 4045, the user is notified by global shopping cart 300 of any activity of the invitee, or of selected activities designated by the customer. However, as a default, the user is always notified of purchases made by each invitee so that appropriate acknowledgements and a thank you note can be sent.

At 4050, the user can accept updated items to purchase, as suggested by the invitee. At 4055, the user adds images or comments to the theme or category. A purchase can be completed by the user as described above. At 4060, the transaction for the shopping session is completed. The user ends the session at 4065 by logging out or closing the application being used.

Figure 10:
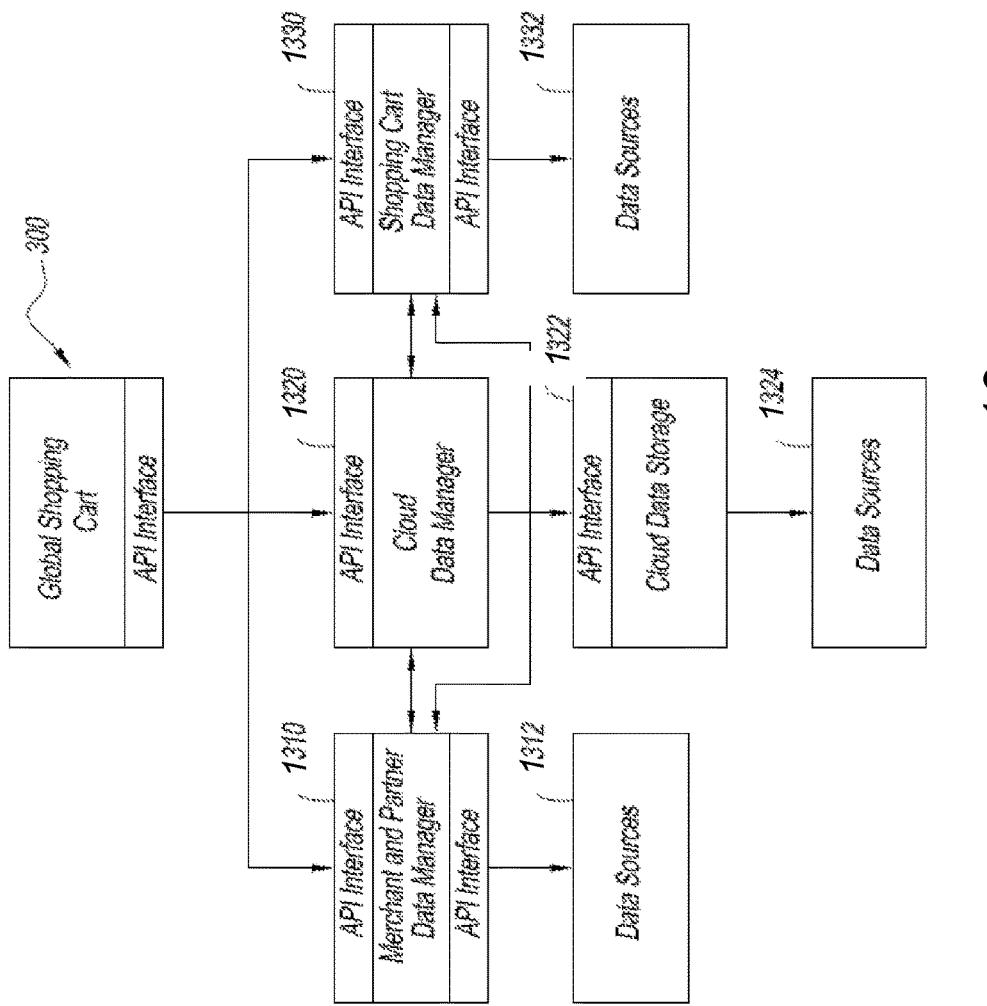
FIG. 10 is a diagram illustrating managers of an exemplary data management system (API) that can be used with the global shopping cart of FIG. 2.

Referring to FIG. 10, the global shopping cart 300 offers a flexible API framework to manage the data relationships between the global shopping cart and the major components that encompass data management access. There are three primary components interfacing with various data stores including a merchant and partner data manager 1310, a cloud data manager 1320, and a shopping cart manager 1330.

The merchant and partner data manager component 1310 is connected, through an API interface, to data sources 1312. Data sources 1312, such as merchants and other partners, including, but not limited to, data warehouses, shipping facilities, port authorities, merchant web sites, and government sites. The purpose of this component 1310 is to flexibly connect to the various merchants and partners and their data, and exchange information that the global shopping cart requires, including but not limit to, social media data, loyalty, rewards, inventory, shipping, SKU, profile, credentials, and relationship data.

The cloud data manager component 1320 is connected, through an API interface, to public and private clouds 1322 and has access to various data sources 1324 as can be stored in these environments. The cloud data manager component 1320 is flexible to expand over time. For example, the cloud data manager 1320 can access stored mobile data (many mobile devices do not allow storage of sensitive or are designed to handle huge data downloads), regional data (international data stored locally in a country for example), partner data, profile data, social media, historical data, image and video (large blob types of data), and government data. The data in this environment can include data that can be interconnected with merchants/partners, and the global shopping cart data storage.

The shopping cart data manager component 1330 is connected, through an API interface, to data sources 1332 of all of the local or remotely stored shopping cart data. The data to be accessed includes, but not be limited to, profile data, security data, languages, financial, cart data, transaction data, connection data (includes links to other data storage), log data, currencies, history, loyalty, rewards, and payments data. The data accessed directly by the shopping cart data manager is considered some of the most local data dependent on quick access requirements, such as data to be displayed in a cart for purchase.

Each component described above will connect to the various data stores through a flexible API framework. The API framework has the ability to share links (references) between each component so that when one component needs information from another component, it is simple for the data to be retrieved. The shopping cart data manager can continually connect to various data sources to update relevant information for the cart owner. For example, a 'crawler' capability within the global shopping cart can determine when a coupon has expired and automatically try to refresh the coupon if a new one has been made available by the merchant. Other crawling functions can include, but are not limited to, updates to currency conversion rates for cross border transactions, updates on shipping data, and updates to remaining inventory.

In accordance with this disclosure, a flexible method is provided to owners of private and public clouds to connect easily to the global shopping cart and share data as it becomes available.

In accordance with this disclosure, the API is built with a flexible framework, anticipating other data storage options, such as advanced cloud storage capabilities, closed networks, and government networks. In accordance with this disclosure, as a control for the amount of data and information stored, the needs of the owner and users dictate the amount and type of information and data, availability, and updates. Data and information that is not needed by the owner or users should be removed from the data stores.

Figure 11:
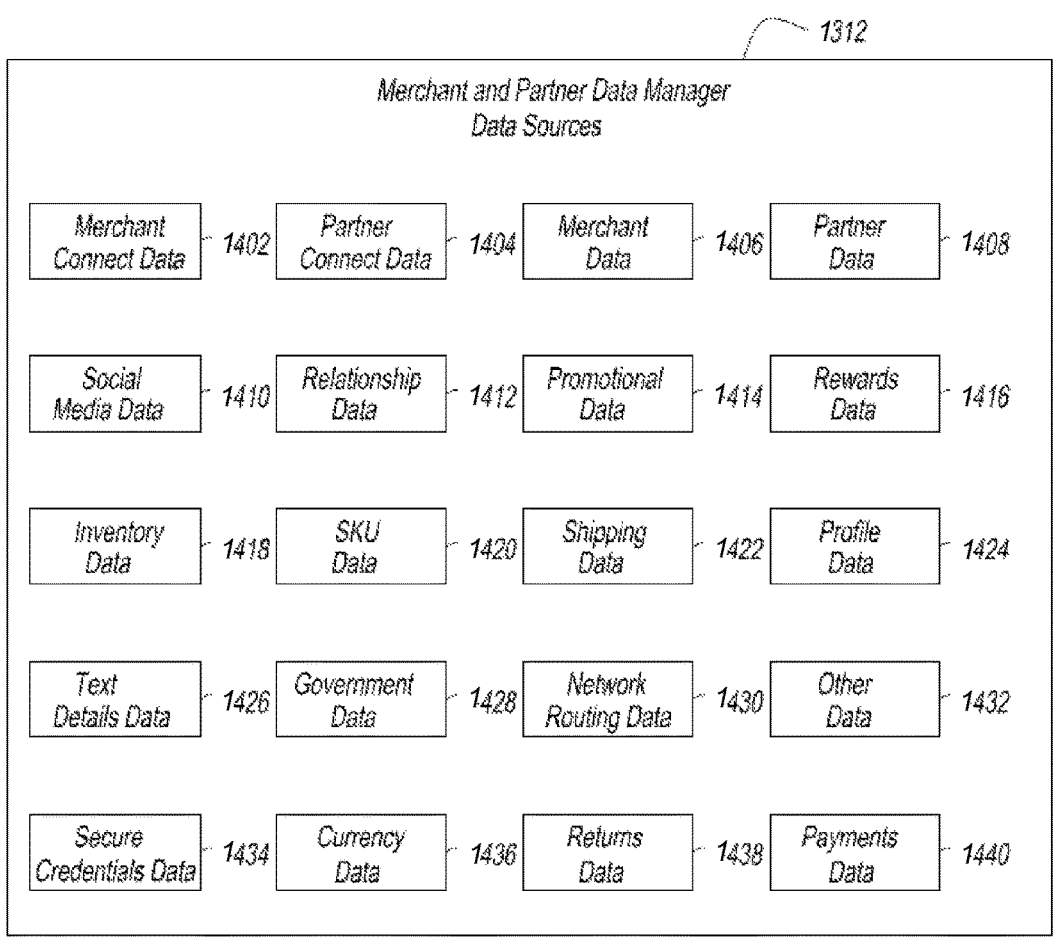
FIG. 11 is a diagram illustrating the data access components of an exemplary merchant and partner data manager that can be used with the global shopping cart of FIG. 2.

Referring to FIGS. 10 and 11, the data sources 1312 of the merchant and partner data manager component 1310 include, for example, merchant connect data 1402, partner connect data 1404, merchant data 1406, partner data 1408, social media data 1410, relationship data 1412, promotional data 1414, rewards data 1416, inventory data 1418, SKU data 1420, shipping data 1422, profile data 1424, text details data 1426, government data 1428, network routing data 1430, secure credentials data 1434, currency data 1436, returns data 1438, payments data 1440, and other data 1432.

Figure 12:
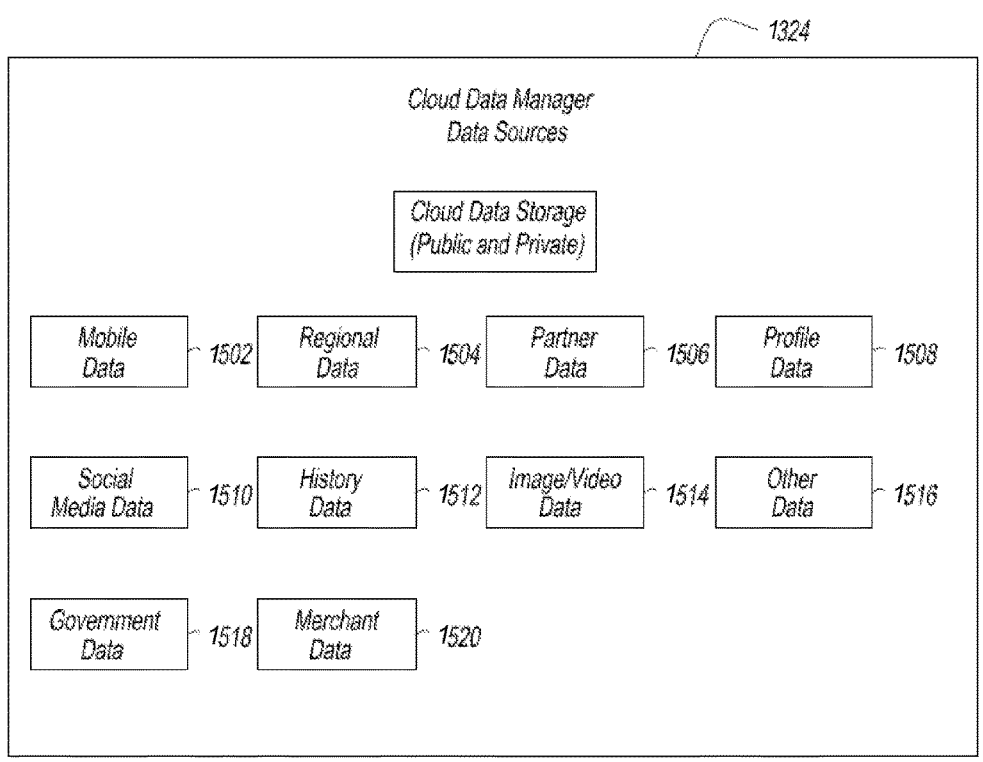
FIG. 12 is a diagram illustrating the data access components of an exemplary cloud data manager that can be used with the global shopping cart of FIG. 2.

Referring to FIGS. 10 and 12, the data sources 1324 of the cloud data manager component 1320 include, but are not limited to, mobile data 1502, regional data 1504, partner data 1506, profile data 1508, social media data 1510, history data 1512, image/video data 1514, government data 1518, merchant data 1520, and other data 1516.

Figure 13:
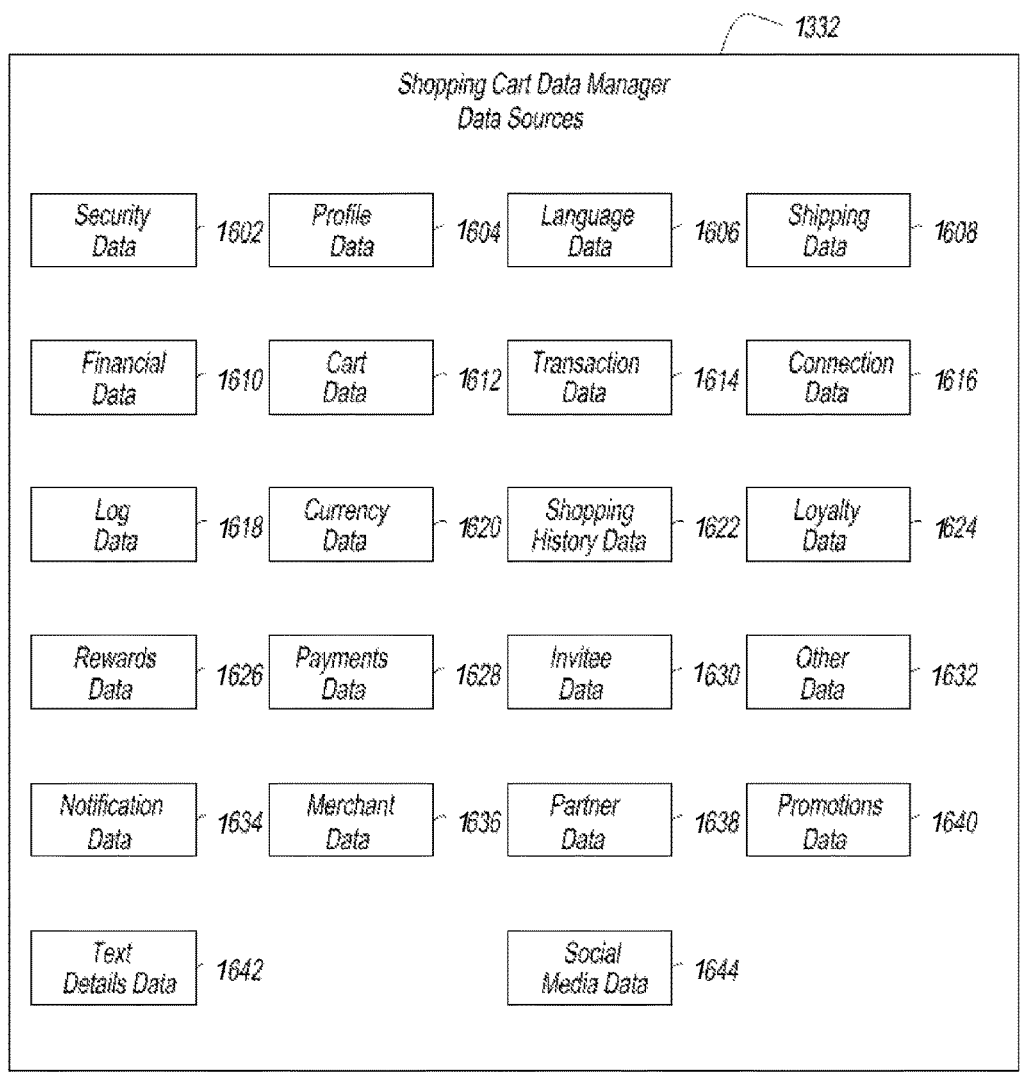
FIG. 13 is a diagram illustrating the data access components of an exemplary shopping cart data manager that can be used with the global shopping cart of FIG. 2.

Referring to FIGS. 10 and 13, the data sources 1332 of the shopping cart data manager component 1330 include, but are not limited to, security data 1602, profile data 1604, language data 1606, shipping data 1608, financial data 1610, cart data 1612, transaction data 1614, connection data 1616, log data 1618, currency data 1620, shopping history data 1622, loyalty data 1624, rewards data 1626, payments data 1628, invitee data 1630, notification data 1634, merchant data 1636, partner data 1638, promotions data 1640, test details data 1642, social media data 1644, and other data 1632.

Figure 14:
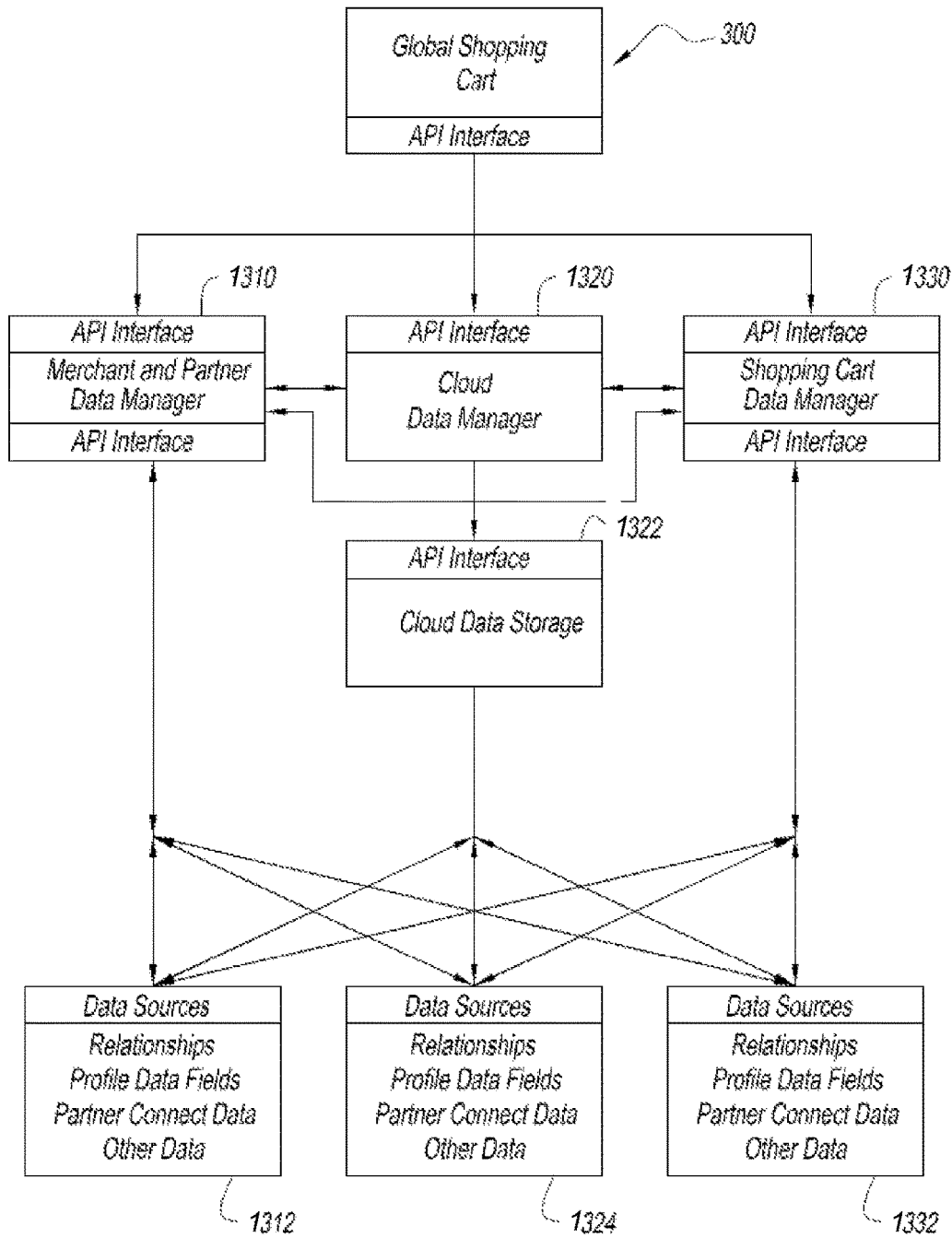
FIG. 14 is a diagram illustrating the interrelationships between data sources of data managers of an exemplary data management system (API) that can be used with the global shopping cart of FIG. 2.

FIG. 14 illustrates the interrelationships between data sources of data managers for an exemplary data management system (API) that can be used with the global shopping cart of FIG. 2. FIG. 14 shows how the data sources 1312, 1324 and 1332 of each of the merchant and partner data manager 1310, the cloud data manager 1320, and the shopping cart data manager 1330 are interrelated with each other, and share data and links (references) amongst each other. Illustrative data of the data sources of the interrelationship include, but are not limited to, relationships, profile data fields, partner connect data, and other data. The interrelationships among the data sources allow the data to be made consistent across the various data managers of the global shopping cart, and readily accessible to the owner or users of the global shopping cart.

Figure 15:
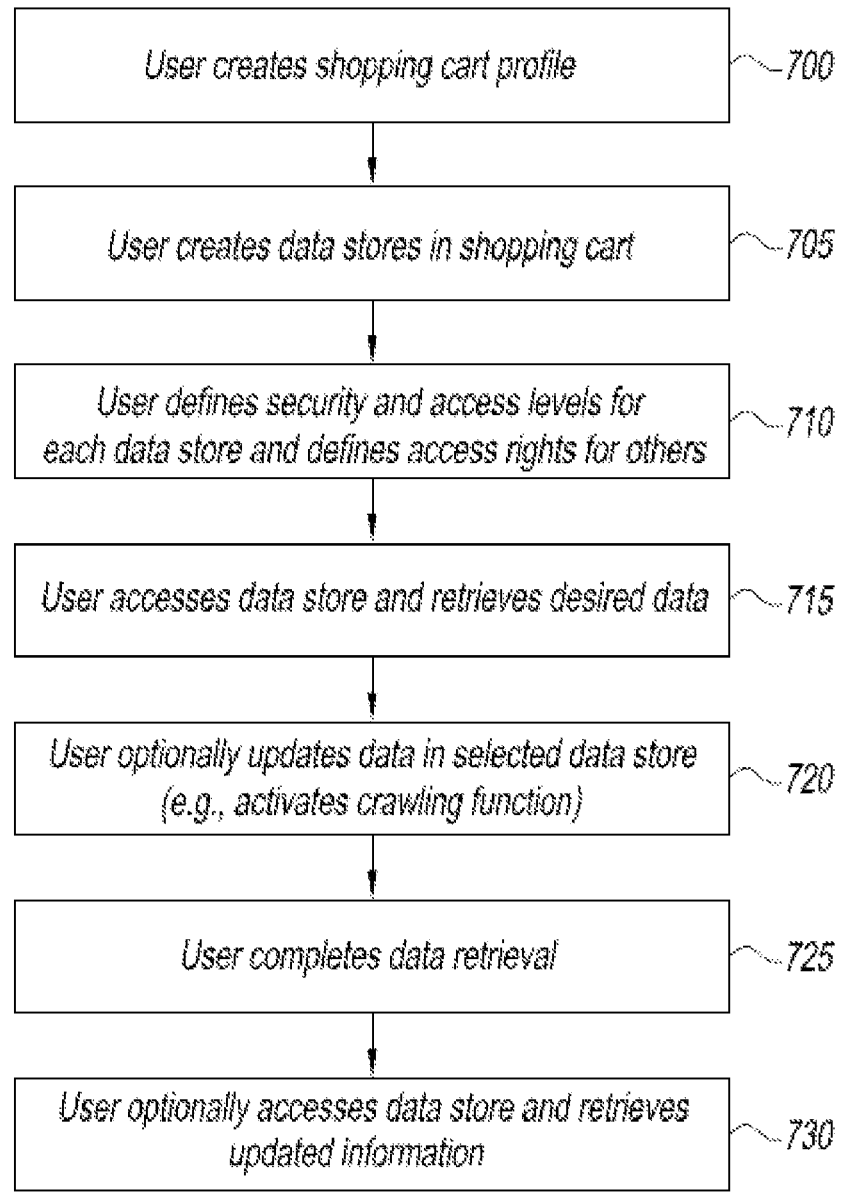
FIG. 15 is a flow chart representing the manner in which a user or owner uses the shopping cart including the retrieval of desired data from data stores in the global shopping cart.

FIG. 15 illustrates the use of the data management system of the present disclosure in the creation and utilization of global shopping cart 300. At 700, the owner or someone authorized by the owner to use global shopping cart 300 (hereinafter collectively or separately referred to as a user) creates a profile for local shopping cart 300 by connecting to server 100 of FIG. 1. This operation can be accomplished by a mobile communication device or computer connection.

At 705, the user creates data stores in global shopping cart 300. As an alternative, a set of default data stores can be made available for selection by the owner of global shopping cart 300.

At 710, the user defines security and access levels for each data store and defines access rights for others. A message can be sent to others inviting them to participate in selected data stores via e-mail, or via social media interface 208 of FIG. 2.

At 715, the user and optionally invitees of global shopping cart 300 accesses the data stores and retrieves desired data therefrom. At 720, the user can optionally update data in selected data stores by using, for example, the crawling function described herein. At 725, the user completes the data retrieval. The user ends the session by logging out or closing the application being used.

At 730, after completion of the update of data and information at 720, the user can optionally access the data store again and retrieve updated information.

Global shopping cart 300 can be configured to provide access logs and various reports to the cart owner, such as, for example, a list of items purchased for a remodel, which may be of tax significance at a later time as adding to the tax basis of the house or may be of significance when an item must be repaired or replaced.

The cart owner can grant access to authorized individuals to run such reports. In a small business, an office manager or a tax accountant can run reports. As suggested above, these reports can be used in view of tax significance at a later time, such as, adding to the tax basis of the house, or can be of significance when an item must be repaired or replaced. Some items can be designated as tax deductible for the current tax year and, thus, for inclusion with annual tax filings.

A report of invitee activity can be generated. The report can be reviewed as desired to determine which invitee made significant contributions, whether by way of suggestions that were adopted or by way of purchasing items for the cart owner as gifts.

Reports summarizing daily, weekly, monthly and yearly spending can be generated. These reports can be sorted by merchant category, product category or SKU type, method of payment, currency used, country of purchase, date of purchase, amount spent per purchase, gift recipient, or in almost any other manner for which data has been supplied.

The running of a report is an event that is logged with a record kept of the person who ordered or ran the report. Such reports are periodically given or immediately copied to the owner of the global shopping cart.

In view of global shopping cart 300 being accessible by an application on most, if not all, smart telephones, all images, videos, sounds or audios, and other data present on the smart phone can be uploaded in real time to the appropriate category or theme of global shopping cart 300 in real time. Some images, videos and sounds may be of special significance to the owner of global shopping cart 300 and will be available for a lifetime and, perhaps, beyond, to serve as reminders of particular significant events, such as vacations or social gatherings. Access can be granted to select family members and friends so that they can experience the sights and sounds of a joyous occasion or an adventure.

For an item purchased with global shopping cart 300, images, videos or sounds can be included with the item at the time of purchase or at a later time. For example, if a grandparent purchases a pet for a child, the grandchild can upload a special thank you video to be shared with the grandparent who has access to global shopping cart 300. Later generated items, such as a video of the child playing with the pet, can also be uploaded.

When global shopping cart 300 is accessed by a mobile device that has a GPS receiver, the location of the mobile device can become a basis for selecting the manner in which some of the functions described above operate. For example, a default currency, shipping methods and carriers, and browsing for items to be added for purchase, can be directed based on the current location of the mobile device.

One or more web sites may be established by shopping cart 300 for each task, category or theme established. Generic templates for a web page or a portion of a web page as well as customization tools can be provided. The global shopping cart 300 can have a standard or universal home page. A suite of tools (possibly accessible from a drop down menu), including a set of very simple and easy to use tools, as well as more complex tools that may require knowledge of how to write code in a language such as, for example, HTML, can be provided. The owner can use the tools most appropriate to his or her skill level to establish and maintain the page or pages on the web site. Options can include various widgets that can be pulled from a menu and dropped at screen locations satisfactory to the user.

A dashboard display can be used to manage various functions and categories. A list of all categories can be displayed on the dashboard. A blog area or page can be established, with a forum section. Again, a social area can be used to make friends and to invite them to join and access a task, category or theme. Alerts received from various sources can be linked to icons on the dashboard so that the user of global shopping cart 300 is made aware of the alert, by for example, flashing of the icon or a change in its color. An alert also can be provided by the use of audio, including playing a particular sound, tone or music, or the sounding of particular words. An alert can still also be provided in video form, including the playing of a portion of a movie or other video clip.

An opt-in function for alerts can be provided by global shopping cart 300 for various categories or themes. For example, cat enthusiasts can be interested in receiving alerts relating to cats, such as cat food, cat grooming, and cat health products and services. A list of forums or relevant sites can be provided, and a box checked or unchecked for each site to determine whether alerts are received when some new activity occurs on a site. These alert functions can apply to a product or a group of products. The owner or user of global shopping cart 300 will thus know when special promotions or advantageous sales terms are available.

Again, as previously discussed, an owner or operator of a global shopping cart 300 can be almost any entity. Such an entity includes, but is not limited to, a business, a consortium of businesses (such as, by way of example, and not by way of limitation, the businesses in a local shopping mall or businesses selling the same lines of products in different locations), a school, a club, a fraternity or sorority, an organization having members in a particular trade or profession, a sales representative for particular products, a charity, a not-for-profit organization, a labor union, a local government, and a government agency.

It will be understood that the present disclosure can be embodied in a computer readable non-transitory storage medium storing instructions of a computer program that when executed by a computer system results in performance of steps of the method described herein. Such storage media can include any of those mentioned in the description above.

The terms "comprises" or "comprising" are to be interpreted as specifying the presence of the stated features, integers, steps or components, but not precluding the presence of one or more other features, integers, steps or components or groups thereof.

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A global shopping cart payment system in a global shopping cart, the system comprising:
   a security module configured to provide several levels of security for the global shopping cart;
   a payment module including a payment interchange;
   an application programming interface (API) framework for the payment interchange;
   a processor and a memory that has instructions that are readable by the processor, and when read by the processor causes the processor to:
      establish the global shopping cart for an owner in the memory, wherein the global shopping cart comprises a plurality of web accessible areas for at least one web site for the global shopping cart, wherein the global shopping cart has a payment module having owner payment information including an owner payment mode, and wherein the security module provides a level of access security for each of the plurality of web accessible areas;
      create for the owner, a task in the global shopping cart, wherein the global shopping cart is configured to discretely store data relating to an item that relates to the task;
      establishing, in the global shopping cart, a web site representative of the task, wherein the security module provides the level of access security for the plurality web-accessible areas of the web site representative of the task;
      provide a selected area of the plurality of web accessible areas of the web site that is representative of the task in the global shopping cart that is accessible by the owner of the global shopping cart and an invitee of the global shopping cart;
      receive profile information from the invitee to permit access for the invitee the selected area of the global shopping cart, and invitee payment information for at least one invitee payment mode;
      create a profile for the invitee based on the profile information and the payment information;
      receive a request from the owner or the invitee to add the item to be purchased to the global shopping cart;
      access the payment module of the global shopping cart having owner payment information; and
      conduct a financial transaction in the global shopping cart for the item to be purchased, wherein the financial transaction is conducted using both invitee payment information and owner payment information to enable the owner and invitee to share payment for the item, wherein the API framework supports the payment interchange for paying for the item to be purchased by one or more users of the global shopping cart and by one or more payment modes or sources,
   wherein the system comprises a plurality of security measures for protecting the global shopping cart, and wherein the security measures include one or more analytic triggers configured to identify suspicious shopping cart activity related to the task, wherein the system is configured to suspend shopping cart activity when the one or more analytic triggers identify the suspicious shopping cart activity.

2. The system of claim 1, wherein the processor is further caused to send an invitation to the invitee to join the global shopping cart.

3. The system of claim 1, wherein the payment module includes an owner payment mode having the owner payment information.

4. The system of claim 1, wherein the payment module includes an invitee payment mode having the invitee payment information.

5. The system of claim 1, wherein the processor is further caused to provide access to the selected area in the global shopping cart for a merchant via merchant API.

6. The system of claim 5, wherein the merchant API is configured to give access to the global shopping cart to manage inventory needs and understand future products that would be desirable to the owner of the global shopping cart.

7. The system of claim 5, wherein the merchant API is configured to give access to the global shopping cart to indicate that the item is not in inventory and provide an indication of when the item will be available.

8. The system of claim 5, wherein the memory further comprises a merchant data store having information relating to goods and services of the merchant, wherein the data store includes rewards offered by the merchant generated by purchases greater than a predetermined value or promotional codes.

9. The system of claim 5, wherein the merchant API is configured for a contractor.

10. The system of claim 5, wherein the merchant API is configured to provide a suggestion to add a second item to the global shopping cart that is related to the task.

11. The system of claim 1, wherein the memory further comprises a financial data store including information relating to international finance, domestic finance, and personal finance, and the instructions further cause the processor to execute the step of updating the information in the financial data store using a crawling function.

12. The system of claim 1, wherein the global shopping cart further comprises a public area to post items for swap or barter between the owner and a user of a second global shopping cart.

13. The system of claim 1, wherein the global shopping cart further comprises a shipping module for managing a shipping preference, wherein the shipping preference is at least one preference selected from the group consisting of: parcel post, regular mail, air shipments, courier, digital delivery, in-store pick up, pick up at another location, and a location found by doing an internet search with a smartphone.

14. The system of claim 1, further comprising a dashboard area in the global shopping cart enabling the owner to change payment mode preferences.

15. The system of claim 1, wherein the owner payment mode is at least one mode selected from the group consisting of: a digital wallet, near field communication (NFC), quick response (QR) code, and a third party payment system.

16. The system of claim 1, wherein the invitee payment mode is at least one mode selected from the group consisting of: a digital wallet, near field communication (NFC), quick response (QR) code, and a third party payment system.

17. The system of claim 1, wherein the invitee payment mode is a non-traditional mode selected from the group consisting of barter, virtual currency, bitcoin, social media credit, automated clearing house (ACH), coupon, biometric payment, enhanced mobile payment through a camera or geo location device, payment through a form factor comprising a watch, ring, eye glasses, hand or body gestures in coordination with a mobile or other form factor, enhanced and virtual currency.

18. The system of claim 1, wherein the owner payment mode is a non-traditional mode selected from the group consisting of barter, virtual currency, bitcoin, social media credit, automated clearing house (ACH), coupon, biometric payment, enhanced mobile payment through a camera or geo location device, payment through a form factor comprising a watch, ring, eye glasses, hand or body gestures in coordination with a mobile or other form factor, enhanced and virtual currency.

19. The system of claim 1, wherein the transaction is conducted using at least two different owner payment sources.

20. The system of claim 1, further comprising an owner profile data store that includes profile information comprising age range, income range, gender, and residence to enable a merchant to tailor a merchant's product, service, and inventory to the owner of the global shopping cart.

* * * * *